(12) United States Patent
Palmer et al.

(10) Patent No.: US 11,437,789 B2
(45) Date of Patent: Sep. 6, 2022

(54) INSTALLATION TOOL FOR TIE TUBES

(71) Applicant: Preformed Line Products Co., Mayfield Village, OH (US)

(72) Inventors: Jacob Palmer, Chesterland, OH (US); Cameron Clines, Gates Mills, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 179 days.

(21) Appl. No.: 16/704,036

(22) Filed: Dec. 5, 2019

(65) Prior Publication Data

US 2021/0175692 A1 Jun. 10, 2021

(51) Int. Cl.
*H02G 1/02* (2006.01)
(52) U.S. Cl.
CPC ..................... *H02G 1/02* (2013.01)
(58) Field of Classification Search
CPC ....................................................... H02G 1/02
See application file for complete search history.

(56) References Cited

U.S. PATENT DOCUMENTS 9,853,426 B2 * 12/2017 Hendricks ................ B25G 1/04

FOREIGN PATENT DOCUMENTS

| CN | 106374321 B | * | 6/2018 |
| JP | H07-274200 | * | 10/1995 |
| JP | 2009219326 A | * | 9/2009 |
| JP | 2014003867 A | * | 1/2014 |
| JP | 2016135013 A | * | 7/2016 |

* cited by examiner

*Primary Examiner* — Carl J Arbes
(74) *Attorney, Agent, or Firm* — Cooper Legal Group, LLC; William J. Cooper

(57) ABSTRACT

An attachment tool for attaching a tie tube to a wire includes a body and a first engagement portion extending away from the body. The first engagement portion releasably engages a first end of the tie tube for attachment of the first end of the tie tube to the wire. A second engagement portion extends away from the body and releasably engages a second end of the tie tube for attachment of the second end of the tie tube to the wire after attachment of the first end of the tie tube to the wire. A coupling structure is connected to the body, the coupling structure coupling to a hot stick.

20 Claims, 19 Drawing Sheets

INSTALLATION TOOL FOR TIE TUBES

TECHNICAL FIELD

The instant disclosure is generally directed toward a tool to attach a tie tube to an overhead conductor. For example, the instant disclosure is directed toward a tool used in conjunction with a hot stick to attach a tie tube to an overhead conductor.

BACKGROUND

Tie tubes can be applied to overhead conductors. Tie tubes can be used, for example, can be attached to electrical transmission wires to prevent wear between the transmission wire and an insulator.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In some examples, an attachment tool for attaching a tie tube to a wire includes a body and a first engagement portion extending away from the body. The first engagement portion releasably engages a first end of the tie tube for attachment of the first end of the tie tube to the wire. The attachment tool also includes a second engagement portion extending away from the body. The second engagement portion releasably engages a second end of the tie tube for attachment of the second end of the tie tube to the wire after attachment of the first end of the tie tube to the wire. The attachment tool further includes a coupling structure connected to the body, the coupling structure coupling to a hot stick.

In some examples, an attachment tool for attaching a tie tube to a wire includes a body and a first finger extending away from the body. The attachment tool also includes a second finger extending away from the body and a third finger extending away from the body. The second finger is between the first finger and the third finger. The second finger is offset from the first finger and the third finger such that a plane passing through the first finger and the third finger does not pass through the second finger. At least one of a first distance between the first finger and the second finger is equal to a thickness of the tie tube or a second distance between the second finger and the third finger is equal to a thickness of the tie tube such that the first finger, the second finger, and the third finger releasably engage the tie tube for attachment of the tie tube to the wire.

In some examples, a method of attaching a tie tube to a wire includes engaging the tie tube with an attachment tool such that an interior surface of the tie tube is presented for attachment to the wire. The method also includes using a hot stick, from which the attachment tool extends, to place the interior surface of the tie tube in contact with the wire. The method further includes moving the hot stick such that the tie tube attaches to the wire by overcoming an engagement force between the tie tube and the attachment tool to release the tie tube from the attachment tool.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DETAILED DESCRIPTION

Figure 1:
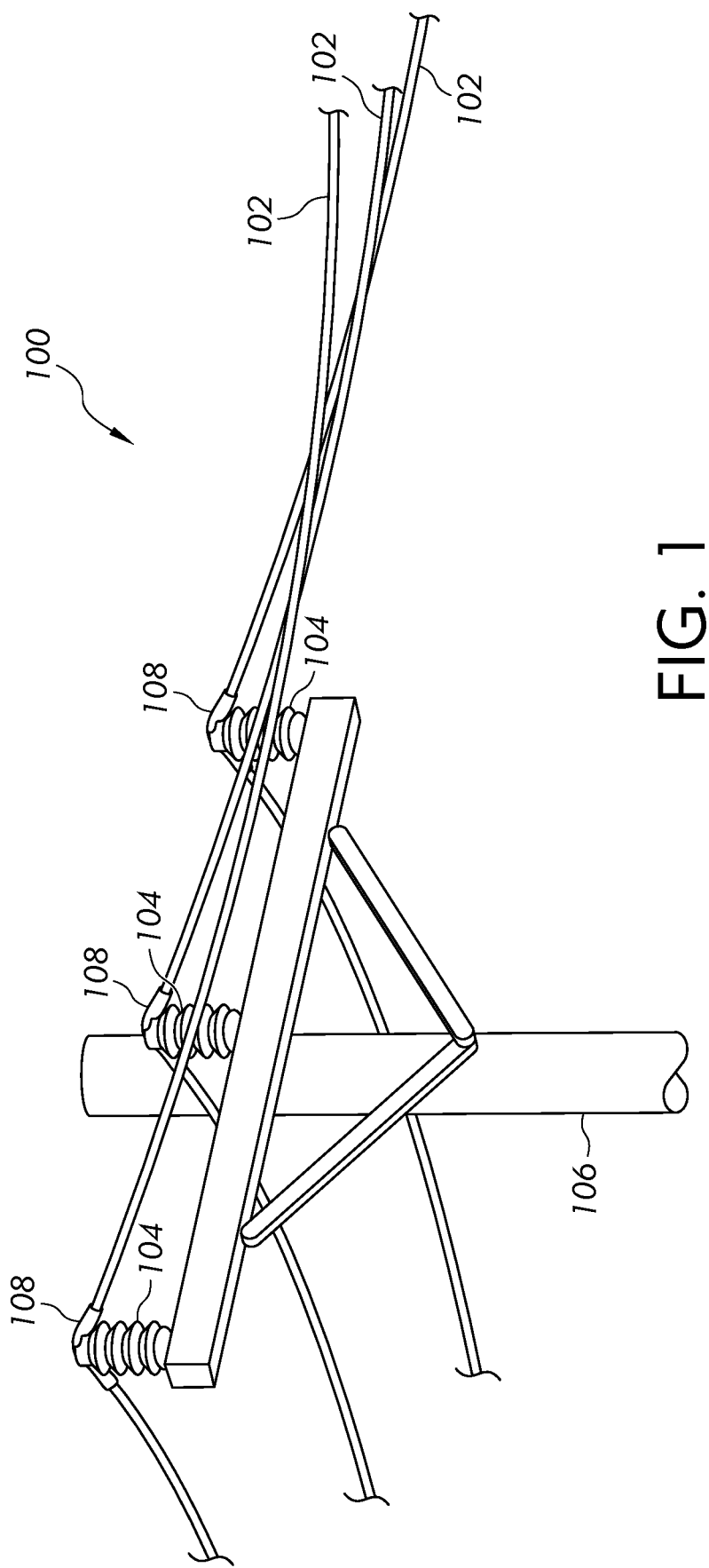
FIG. 1 is a perspective view of an overhead power line environment.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Turning to FIG. 1, an example overhead power line environment 100 is illustrated. The overhead power line environment 100 comprises any number of structures, configurations, constructions, etc., some of which may be described and/or illustrated with respect to FIGS. 1 to 17. In an example, the overhead power line environment 100 may be used in association with electric power transmission and/or distribution. One or more electrical conductors may be suspended by a tower, pole, or the like.

The overhead power line environment 100 includes a wire 102. In some examples, the wire 102 is an electrically conductive wire that may transmit electrical energy through the wire 102. The wire 102 (e.g., a power line, a conductor, etc.) may comprise a metal material that is electrically conductive. For example, the wire 102 can comprise materials including, but not limited to, aluminum alloys or copper alloys. The wire 102 may extend between towers, poles, or the like and, in the illustrated example, may be supported at a distance above the ground (e.g., overhead).

The overhead power line environment 100 comprises an attachment structure 104. It will be appreciated that the example of FIG. 1 illustrates an exemplary attachment structure 104. However, in other examples, the attachment structure 104 is not limited to the illustrated size, shape, construction, design, etc. Rather, the attachment structure 104 comprises any number of constructions, some of which may be used to support a structure (e.g., the wire 102, etc.) at a distance above the ground with respect to a tower, pole, or the like. The attachment structure 104 may include an electrical insulator constructed of glass, ceramic, or any other suitable material or combination of materials. The attachment structure 104 may be directly or indirectly attached to a support structure 106 such as a tower, a pole, or the like.

The overhead power line environment 100 includes a tie tube 108 for supporting the wire 102. As will be described herein, the tie tube 108 may be applied over an outer surface of the wire 102, such that the tie tube 108 may provide a protective layer of material between the wire 102 and the attachment structure 104. In some examples, the tie tube 108 can support (e.g., hold, grip, etc.) the wire 102 and maintain a grip on the wire 102 without damaging the wire 102. With the tie tube 108 at least partially surrounding the wire 102, the wire 102 may pass over the attachment structure 104, beside the attachment structure 104, etc. such that the tie tube 108 is between the wire 102 and the attachment structure 104.

Figure 2:
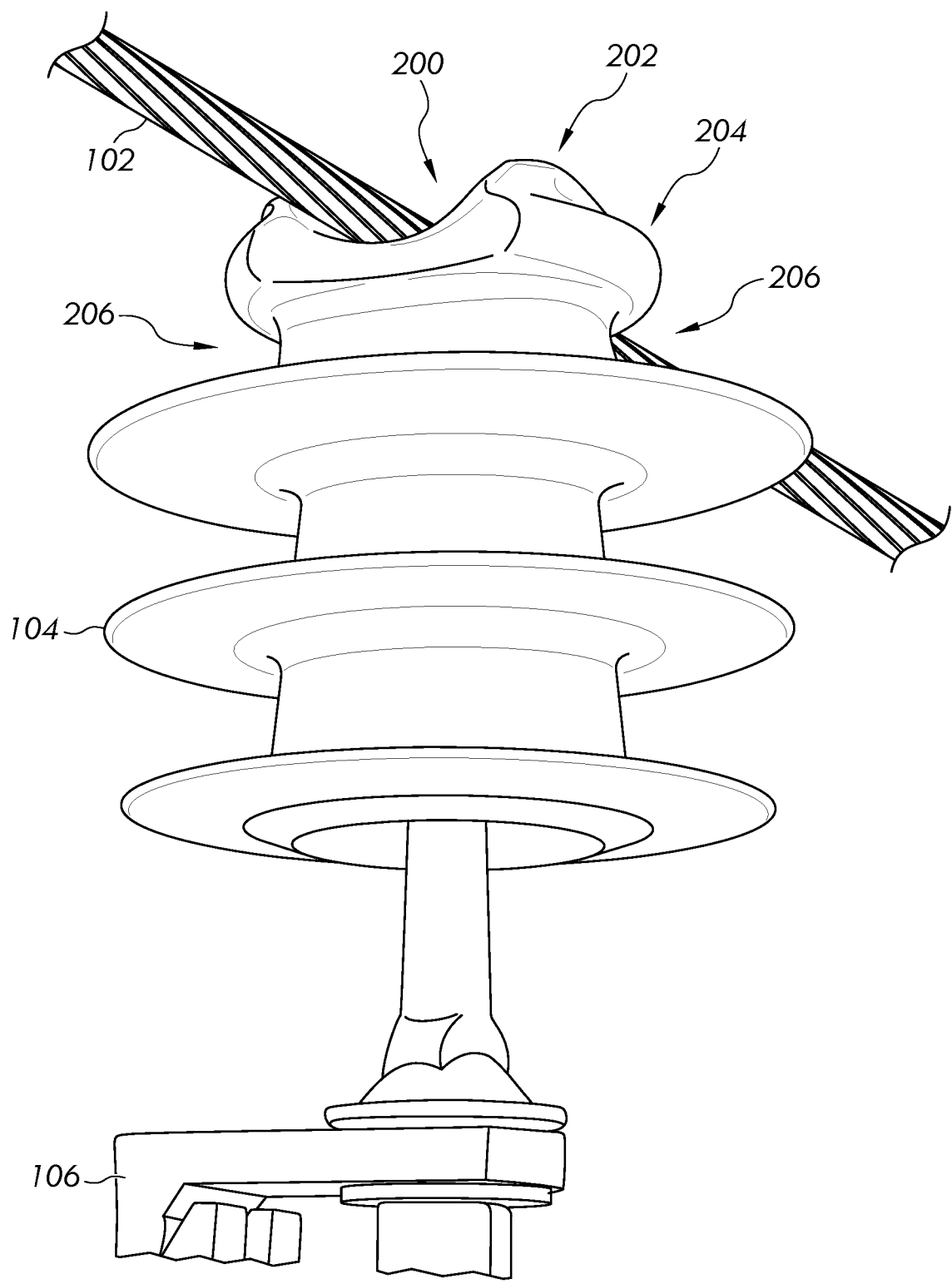
FIG. 2 is a perspective view of an attachment structure.

Referring to FIG. 2, an example attachment structure 104 is illustrated cooperating with the wire 102. As previously discussed, the attachment structure 104 can include an insulator to help prevent undesired electrical power passing from the wire 102 to other structures, objects, etc. In some examples, the attachment structure 104 defines a curved support surface 200 for the wire 102 within a top surface 202 of the attachment structure 104. The wire 102 can contact the support surface 200 such that the attachment structure 104 supports the wire 102 at a distance above the ground with respect to a tower, pole, etc. In some examples, the attachment structure can also define other pathways to support one or more wires 102 such as the outer diameter of a top section 204 of the attachment structure 104, represented by the arrows 206. It is to be understood that the structure in FIG. 2 is shown without a tie tube 108 or any other structure used to maintain the location of the wire 102 with respect to the attachment structure 104 for the sake of clarity.

Figure 3:
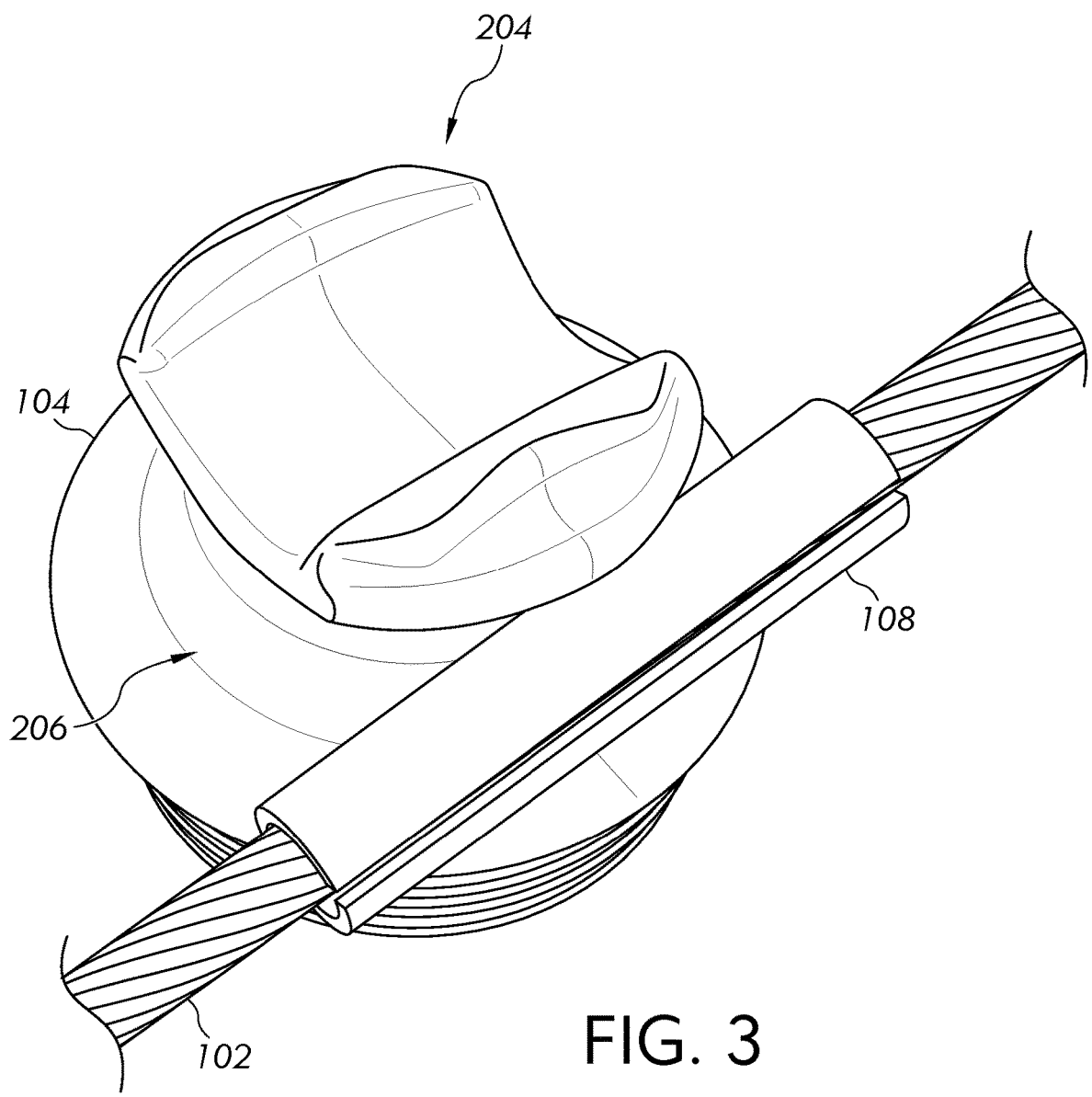
FIG. 3 is a perspective view of an attachment structure with a wire.

Referring to FIG. 3, a top perspective view of the attachment structure 104 is illustrated with the tie tube 108 placed around the outer circumference of the wire 102. As shown, the wire 102 can be located at an outer diameter 208 of the top section 204 of the attachment structure 104 in order to support the wire 102 at a distance above the ground with respect to a tower, pole, etc.

Figure 4:
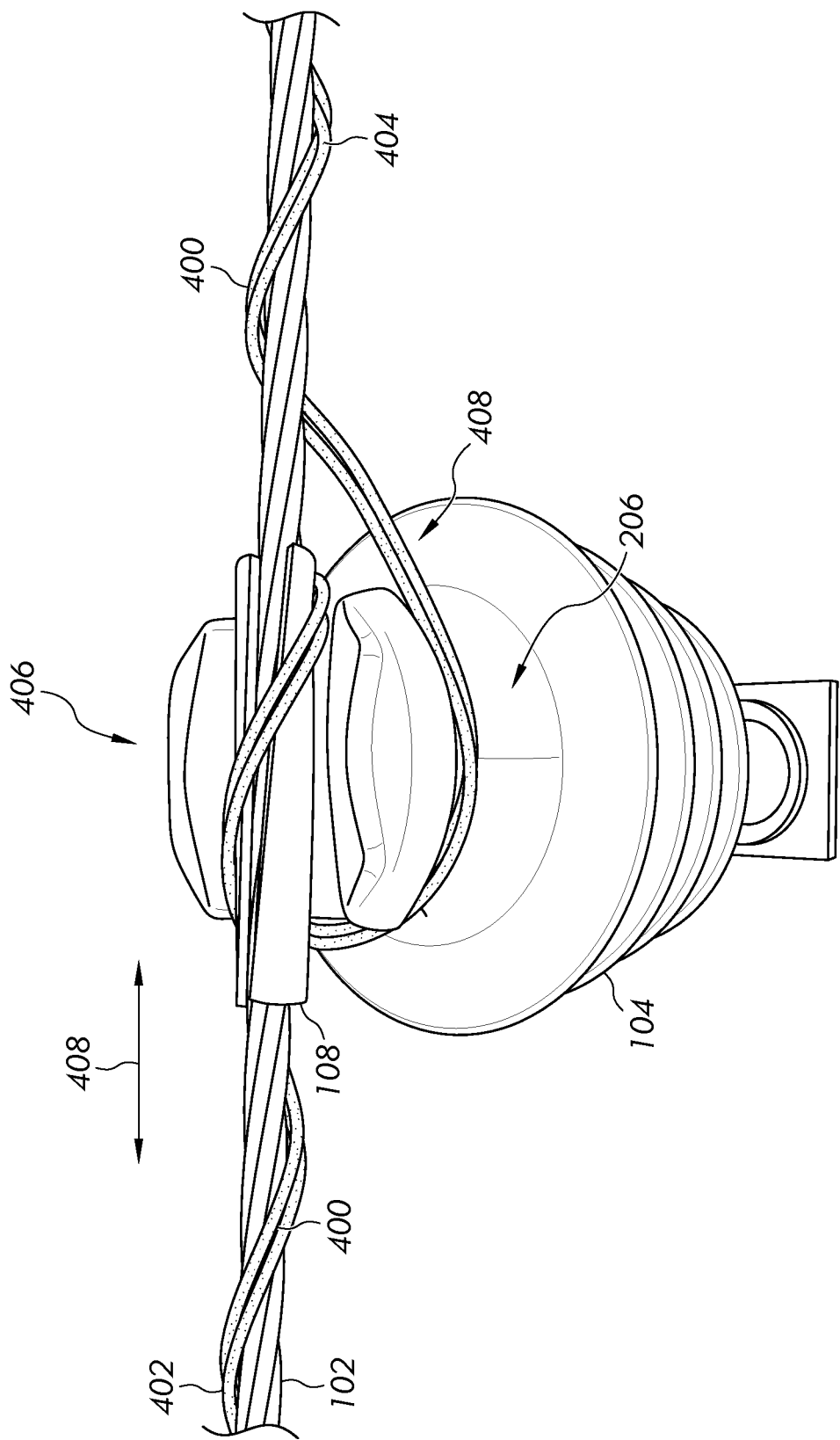
FIG. 4 is a top perspective view of an attachment structure with a wire, a tie tube, and a helical wrap.

Referring to FIG. 4, another top perspective view of the attachment structure 104 is illustrated with the tie tube 108 and a helical wrap 400. The helical wrap can be wound around the wire 102 and a portion of the attachment structure 104 in order to maintain a desired location of the wire 102 with respect to the attachment structure 104. In some examples, the helical wrap 400 can extend from a first end 402 to a second end 404. The helical wrap 400 can form a helix around the wire 102 as shown in FIG. 4 as it extends away from the first end 402 toward the center and right side of the figure. The helical wrap 400 continues to wrap helically around the wire and helps secure the tie tube 108 to the wire 102 and the attachment structure 104 as shown in the area of arrow 406. In some examples, the helical wrap 400 then continues under the wire 102 and is wound around the outer diameter 206 in a counter-clockwise direction. In other examples, the helical wrap 400 can follow the direction of lay of the wire 102, which can be counter-clockwise or other wrapping configurations/directions. The helical wrap 400 then separates from the outer diameter 208 and resumes a helix wrap around the wire 102 until it reaches the second end 404. This is but one example of how the helical wrap 400 can help secure the wire 102 and the tie tube 108 to the attachment structure 104. Of course, any suitable structure or wrapping pattern can be used in cooperation with the present disclosure, and the described wrapping scheme is but one example of many.

In practical use, many attachment structures 104 (e.g., insulators) are provided with tie tubes 108 to be placed around the outer surface of the wire 102. In some examples, the tie tube 108 provides protection for the attachment structure 104 against accelerated wear from vibration, horizontal movement, vertical movement, etc. of the wire 102 against surfaces of the attachment structure 104. As such, the tie tube 108 can eliminate or reduce the wire 102 rubbing into the attachment structure 104 to provide abrasion protection. In some examples, electrical line workers unnecessarily discard the tie tube, despite installation directions to the contrary. In some examples, certification standards for the assembly of electrical distribution and generation lines require the tie tube 108 to be used, and many assemblies are certified with the tie tube 108, and removal of the tie tube 108 may result in assemblies that are not necessarily certified.

In some examples, (e.g., replacement of insulators), an electrical line worker can install an attachment structure 104 (e.g., an insulator), a tie tube 108, and a helical wrap 400 on a live wire. This operation may be completed by some employers with proper personal protective equipment such as thick rubber gloves. In other examples, the electrical line worker can employ a hot stick to apply the tie tube 108 to the wire 102 and secure the wire 102 to the attachment structure 104 using the helical wrap 400.

Figure 5:
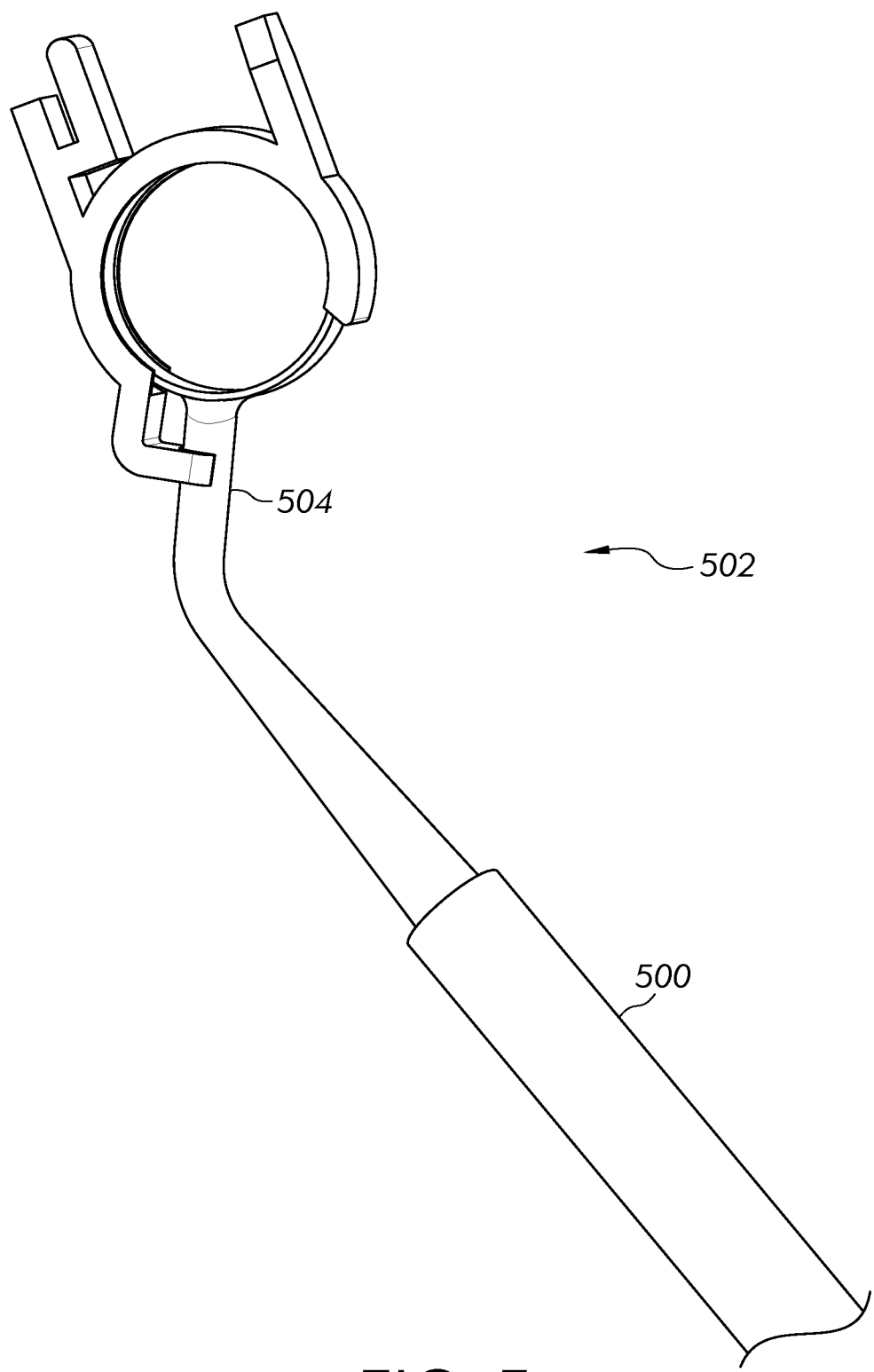
FIG. 5 is a side view of an example attachment tool attached to an applicator ring tool.

Referring to FIG. 5, the hot stick 500 is dielectric and enables contact between the hot stick 500 and an energized line such that the hot stick 500 and the electrical line worker are not a part of a ground circuit. In some examples, a relatively long hot stick 500 can, at times, be beneficial. As shown in FIG. 5, the hot stick 500 can include a ring tool 502 used by an electrical line worker to apply the tie tube 108 to the wire 102 and wrap the helical wrap 400 around the wire 102 and the attachment structure 104. In some examples, the ring tool 502 is a selectively removable attachment that can be attached to and detached from the hot stick 500 as needed by the electrical line worker to accomplish particular tasks. It is to be understood that any number of other tools can be attached to and detached from the hot stick 500, and the ring tool 502 is one example of a tool. FIG. 5 also illustrates an attachment tool coupled to the hot stick 500.

Figure 6:
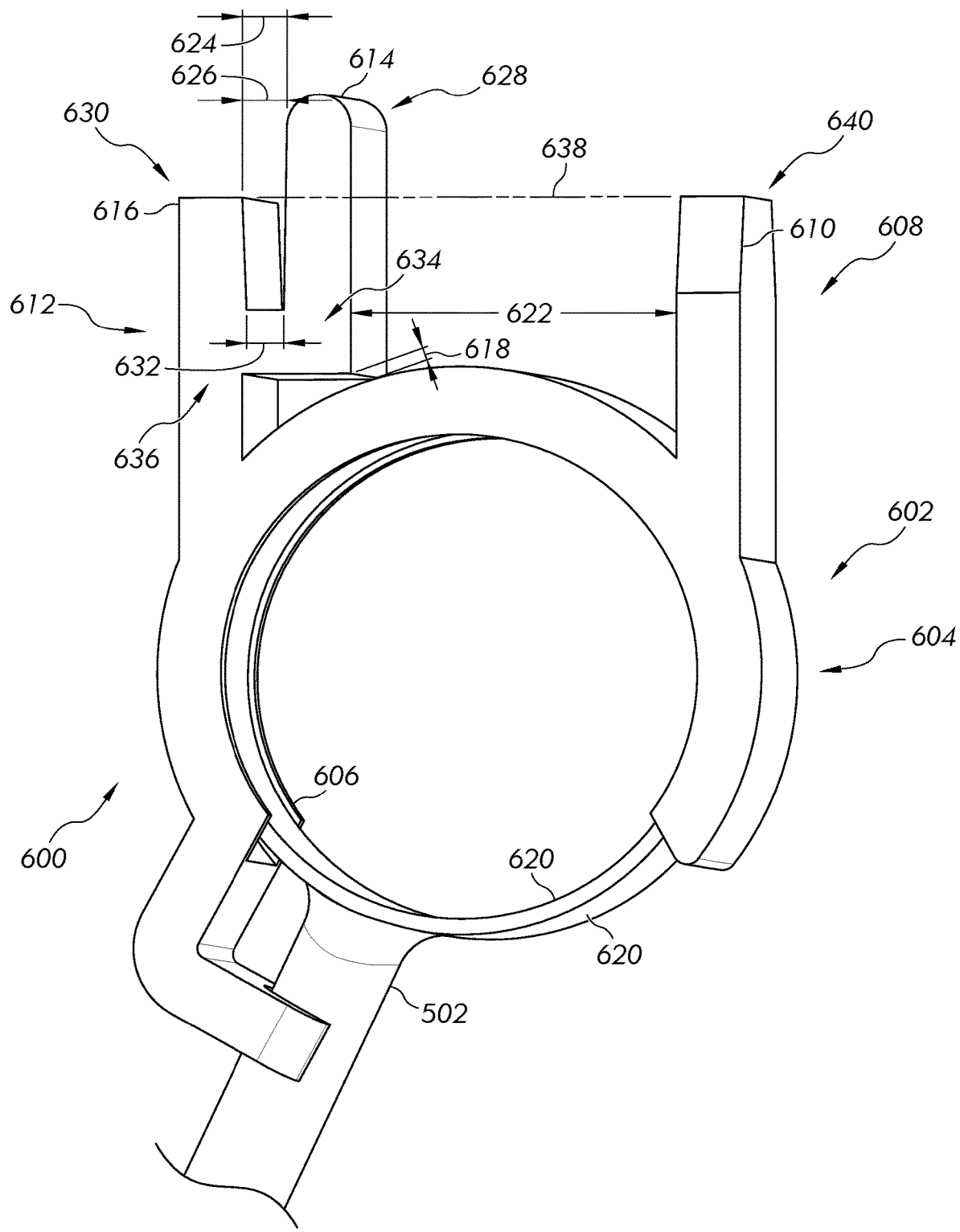
FIG. 6 is a detail view of FIG. 5.

Referring to FIG. 6, the attachment tool 600 for attaching the tie tube 108 to the wire 102 is illustrated. The attachment tool 600 includes a body 602. The body 602 provides a relatively rigid platform or base to which structures used to attach the tie tube are mounted. In the shown example of FIG. 6, the body 602 forms an annular portion 604 configured to cooperate with an outside circumference of the ring tool 502. Of course, other geometries of other example bodies are anticipated, and other examples can include shapes to cooperate with other tool types and geometries. For example, the annular portion 604 example shown is not meant to be limiting, and other geometries are contemplated.

The attachment tool 600 also includes a coupling structure 606 connected to the body 602. The coupling structure 606 couples the attachment tool 600 to the hot stick 500. It is to be understood that the body 602 and the coupling structure 606 can be constructed of any suitable material that is capable of providing a minimum expected service life and having material properties suited to the physical demands of the attachment tool 600. In some examples, the attachment tool 600 is electrically non-conductive. In some examples, the body 602 and the coupling structure 606 can be a monolithic structure.

Figure 7:
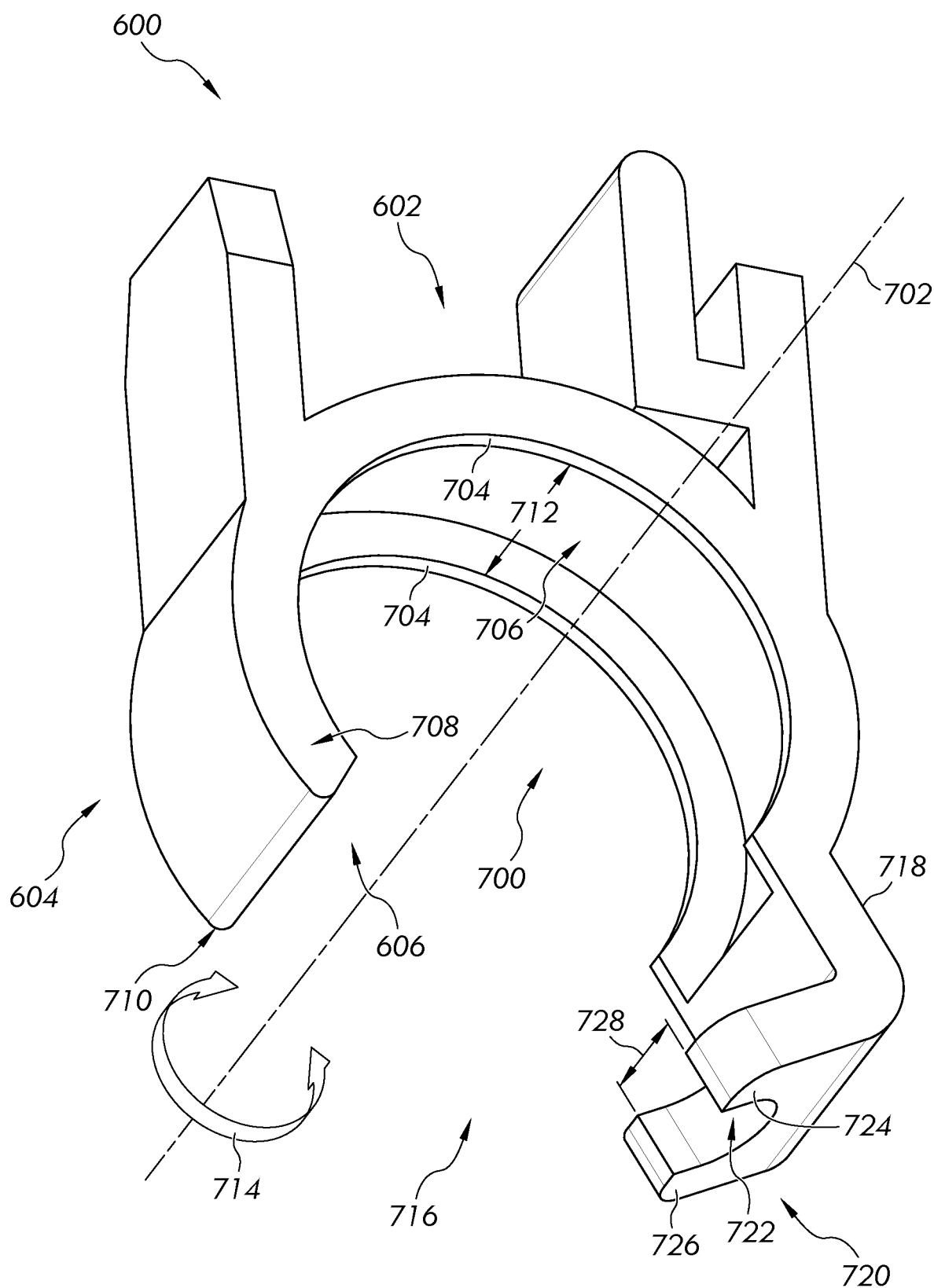
FIG. 7 is a perspective view of an example attachment tool.

Referring to FIG. 7, the coupling structure 606 can include an annular portion 700 extending toward a central axis 702 of the attachment tool 600. In some examples, the coupling structure 606 can include two annular ridges 704 extending away from an inside surface 706 of the body 602. In some examples, the two annular ridges 704 can be located at a first face 708 and a second face 710 of the body 602 and can be separated by a distance represented by arrow 712. The distance 712 can be measured in a direction parallel to the central axis 702 of the attachment tool 600. The distance 712 can be slightly shorter than a distance between two faces or two edges 620 (shown in FIG. 6) of the ring tool 502. In some examples, the two annular ridges 704 can be engineered to have physical properties such as flexibility such that the two annular ridges 704 can be placed around the two faces of the ring tool 502 and elastically deform during a coupling operation to "snap fit" around an outside diameter of the ring tool 502. As such, the attachment tool 600 can be coupled to the ring tool 502 in a snap fit fashion and uncoupled from the ring tool 502 by being snapped away from the ring tool 502 as needed. As such, the attachment tool 600 couples to the annular portion of the applicator ring tool 502 extending from the hot stick 500. In some examples, the distance 712 is greater than the distance between two faces or two edges of the ring tool 502 such that there is not a snap fit between the two annular ridges 704 and the ring tool 502.

In some examples, the body 602 of the attachment tool 600 can also elastically deform in a direction represented by arrow 714. The arrow 714 represents rotational flexibility about the central axis 702, and this elastic flexibility can enable the attachment tool 600 to widen the mouth area 716 where the body 602 annular portion 604 is not complete.

Widening of the mouth area 716 can help the attachment tool 600 fit over the ring tool 502 in order to accommodate the snap on and snap off feature of the attachment tool 600. It is to be appreciated that the engineered and designed geometries of the cooperating structures of the attachment tool 600 and the ring tool 502 and their snap fit feature are calculated to withstand anticipated forces of holding the attachment tool 600 to the ring tool 502 to resist separation during use while attaching the tie tube 108 to the wire 102 and other regular operations. The attachment tool 600 should be removable from the ring tool 502 only after sufficient force is applied by an electrical line worker as needed. The snap fit feature can reduce or eliminate relative motion between the attachment tool 600 and the ring tool 502 in directions parallel to the central axis 702.

Remaining with FIG. 7, the coupling structure 606 can also include an arm portion 718 that couples the attachment tool 600 to a neck portion 504 (shown in FIG. 5) of the applicator ring tool 502 extending from the hot stick 500. Similar to the annular ridges 704, the arm portion 718 can define a second attachment structure 720 to reduce or eliminate rotation of the entire attachment tool 600 in the direction of arrow 714. Any suitable second attachment structure 720 can be used to attach the arm portion 718 to a portion of the ring tool 502 or the hot stick 500. In the shown example, the arm portion 718 can define an aperture 722, slot, or other appropriate shape that can be snap fit at least partially around the neck portion 504 (shown in FIG. 5) of the ring tool 502. As such, the attachment tool 600 can be coupled to a standard ring tool 502 with two snap fits; a first snap fit feature within the body 602 and a second snap fit feature located on the arm portion 718. Of course, greater or fewer snap fit features can be included with the presently described device.

Similar to the annular ridges 704, the second attachment structure 720 can include a first leg 724 and a second leg 726. A side of the first leg 724 can be located within the same plane as the first face 708 while a side of the second leg 726 can be located within the same plane as the second face 710 of the body 602. The first leg 724 and the second leg 726 can be separated by a distance represented by arrow 728. The distance 728 can be measured in a direction parallel to the central axis 702 of the attachment tool 600. The distance 728 can be slightly shorter than a distance between two faces of the neck portion 504 of the ring tool 502. In some examples, the two legs 724, 726 can be engineered to have physical properties such as flexibility such that the two legs 724, 726 can be placed around the two faces of the neck portion 504 of the ring tool 502 and elastically deform during a coupling operation to "snap fit" around the neck portion 504 of the ring tool 502. As such, the attachment tool 600 can be coupled to the neck portion 504 of the ring tool 502 in a snap fit fashion and uncoupled from the neck portion 504 of the ring tool 502 by being snapped away from the neck portion 504 of the ring tool 502 as needed. As such, the attachment tool 600 couples to the annular portion and the neck portion 504 of the applicator ring tool 502 extending from the hot stick 500.

Returning to FIG. 6, the attachment tool 600 includes structures to engage the tie tube 108 to the attachment tool 600 in preparation for attachment of the tie tube 108 to the wire 102. The attachment tool 600 includes a first engagement portion 608 extending away from the body 602. In some examples, the first engagement portion 608 includes a first finger 610 extending away from the body 602.

The attachment tool 600 also includes a second engagement portion 612 extending away from the body 602. The second engagement portion 612 includes a second finger 614 extending away from the body 602 and a third finger 616 extending away from the body 602. The second finger 614 is between the first finger 610 and the third finger 616. As shown in FIG. 6, in some examples, the second finger 614 emanates from the third finger 616 such that the second finger 614 is separated from the body 602 by a separation distance represented by dimension 618.

Figure 8:
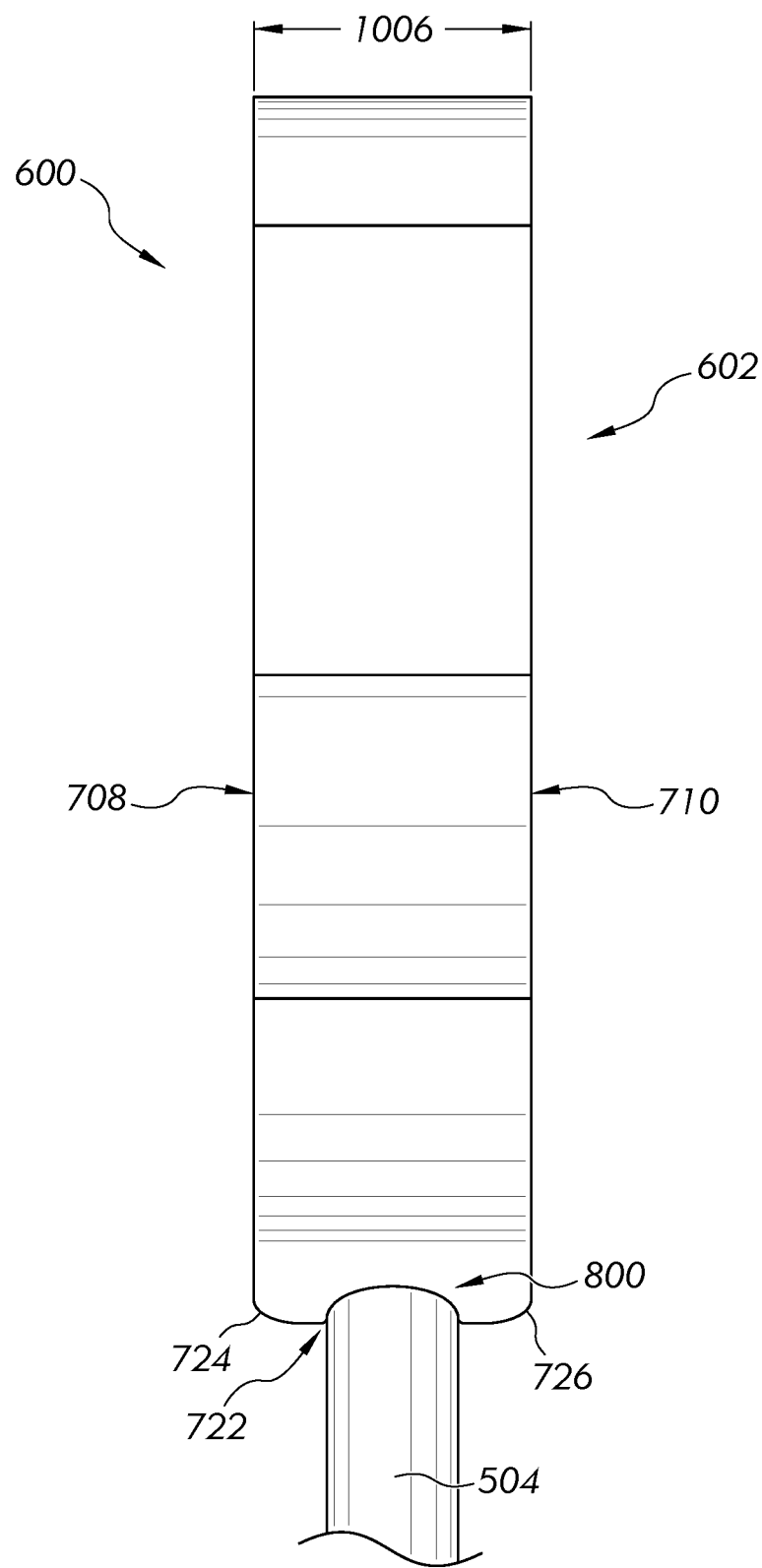
FIG. 8 is a side view of an example attachment tool attached to the applicator ring tool.

Referring to FIG. 8, a side view of the attachment tool 600 is illustrated. The attachment tool 600 can extend from the first face 708 to the second face 710 of the body 602. As shown, the first leg 724 and the second leg 726 are configured to cooperate with the neck portion 504 of the ring tool 502. Additionally, the aperture 722 can include a rounded surface 800 to cooperate with the neck portion 504 of the ring tool 502. In some examples, the first leg 724 and the second leg 726 can define a portion of the aperture 722.

Figure 9:
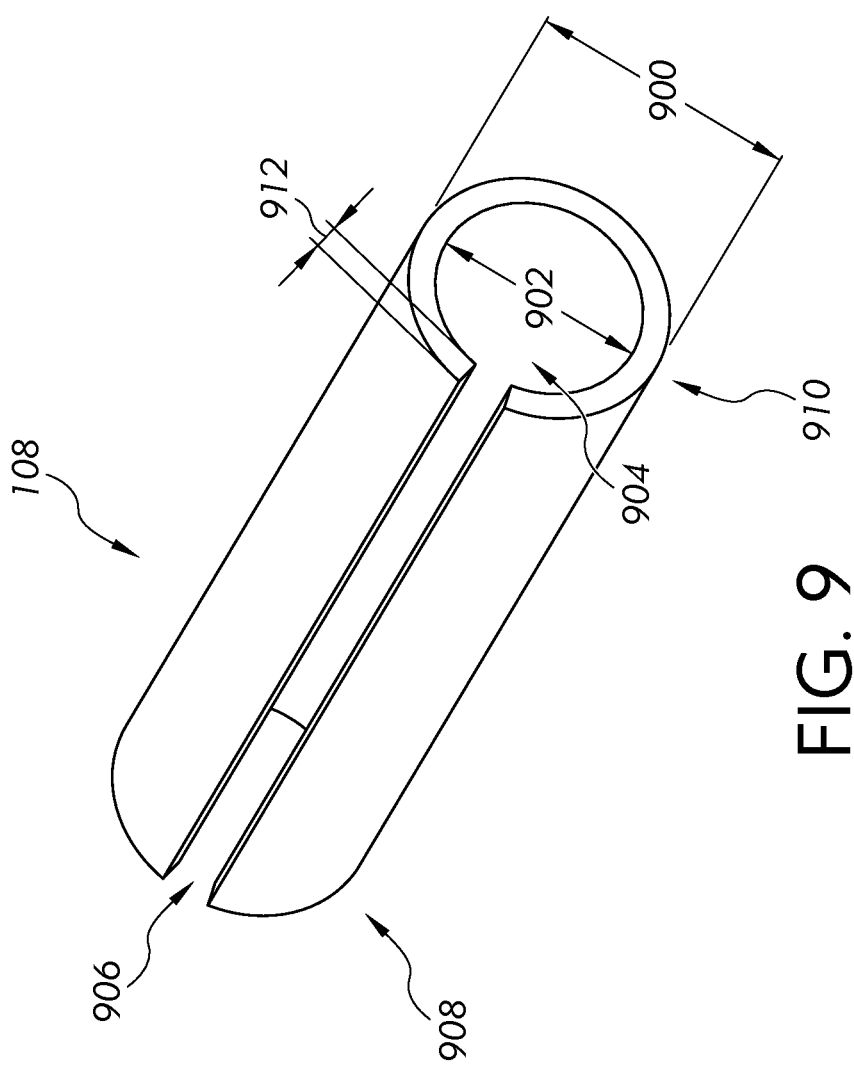
FIG. 9 is a perspective view of a tie tube in a closed configuration.

Referring to FIG. 9, an example of the tie tube 108 is illustrated. The tie tube 108 can have a cylindrical geometry when in a closed or "rolled" position as shown in FIG. 9. The tie tube can include an outside diameter 900 and an inside diameter 902 such that the tie tube 108 defines an interior space 904. In some examples, the tie tube 108 defines a gap 906 extending from a first end 908 of the tie tube 108 to a second end 910 of the tie tube 108 such that the outside diameter 900 and the inside diameter 902 are not continuous around the entire circumference of the tie tube 108. In some examples, the inside diameter 902 of the tie tube 108 can be equal to or nearly equal to an outside diameter of the wire 102. The tie tube 108 can have a thickness as represented by dimension 912.

Figure 10:
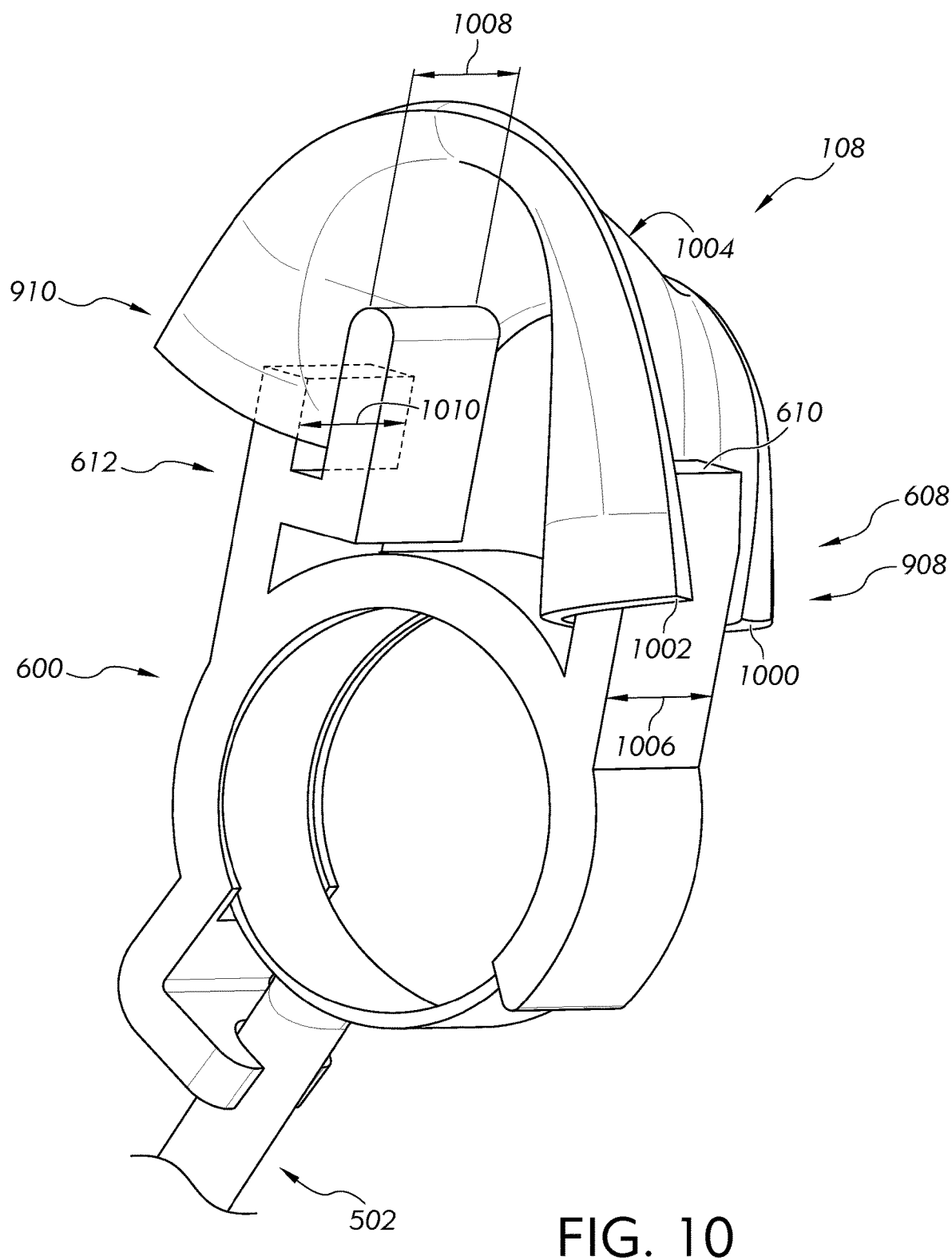
FIG. 10 is a perspective view of the tie tube engaged to an example attachment tool.

Referring to FIG. 10, the tie tube 108 in engagement with the attachment tool 600 is illustrated. The attachment tool 600 and its structures are configured to engage the tie tube 108, hold the tie tube 108 in an open configuration, and urge the tie tube 108 onto the wire 102 to attach the tie tube 108 to the wire 102. In FIG. 10, the tie tube 108 is shown in the open configuration and held in that position by the attachment tool 600. The electrical line worker can open or unroll the tie tube 108 by separating a first side 1000 of the tie tube 108 from a second side 1002 of the tie tube 108. The first side 1000 and the second side 1002 define the gap 906 (shown in FIG. 9), and separation of the two sides 1000, 1002 exposes an interior surface 1004 of the tie tube 108. The electrical line worker can then place the interior surface 1004 of the first end 908 of the tie tube 108 adjacent (e.g., contacting) the first engagement portion 608 (e.g., the first finger 610). As shown, the first engagement portion 608 releasably engages the first end 908 of the tie tube 108 for attachment of the first end 908 of the tie tube 108 to the wire 102. As shown in FIG. 10, a first width 1006 of the first finger 610 can help maintain the tie tube 108 in the open configuration as the interior surface 1004 is not of sufficient length to curl around the first finger 610 and return to the closed configuration. The first width 1006 is also shown in FIG. 8.

With the first end 908 of the tie tube 108 held in place, the electrical line worker can then open the second end 910 of the tie tube 108 and engage the second end 910 with the second engagement portion 612. For example, the electrical line worker can then place the second end 910 between the second finger 614 and the third finger 616. As such, the second engagement portion 612 releasably engages the second end 910 of the tie tube 108 for attachment of the second end 910 of the tie tube 108 to the wire 102 after attachment of the first end 908 of the tie tube 108 to the wire 102. Similar to the first finger 610, the third finger 616 can have a width almost equal to or equal to the first width 1006 that can help maintain the tie tube 108 in the open configuration as the interior surface 1004 is not of sufficient length to curl around the third finger 616 and return to the closed configuration. Additionally, the attachment tool 600 can maintain the tie tube 108 in the open configuration if the tie tube 108 is bent over itself or curled in the arrangement shown in FIG. 10, as the bending configuration tends to prevent the first side 1000 and the second side 1002 from coming back together to close the gap 906.

Returning to FIG. 6, the geometry of and geometric relationships between the first finger 610, the second finger 614, and the third finger 616 can be engineered and manufactured in order to adequately engage the tie tube 108 to the attachment tool 600 such that the tie tube 108 reliably remains engaged with the tie tube 108 until the tie tube 108 is attached to the wire 102. Moreover, the geometry and geometric relationships can help enable a process to attach the tie tube 108 to the wire 102.

In some examples, a first distance 622 between the first finger 610 and the second finger 614 is greater than a second distance 624 between the second finger 614 and the third finger 616. The greater first distance 622 enables the tie tube 108 to be bent over as shown in FIG. 10. The second distance 624 helps the second engagement portion 612 hold (e.g., engage and maintain an engaged position) the second end 910 of the tie tube 108 to the attachment tool 600. In some examples, the second distance 624 is equal to a thickness 912 of the tie tube 108.

In some examples, a third distance 626 between a first end 628 of the second finger 614 distal from the hot stick 500 and a first end 630 of the third finger 616 distal from the hot stick 500 is greater than a fourth distance 632 between a second end 634 of the second finger 614 proximal to the hot stick 500 and a second end 636 of the third finger 616 proximal to the hot stick 500. In some examples, the first end 628 of the second finger 614 distal from the hot stick 500 extends above a line 638 drawn between a first end 640 of the first finger 610 distal from the hot stick 500 and the first end 630 of the third finger 616 distal from the hot stick 500.

Figure 11:
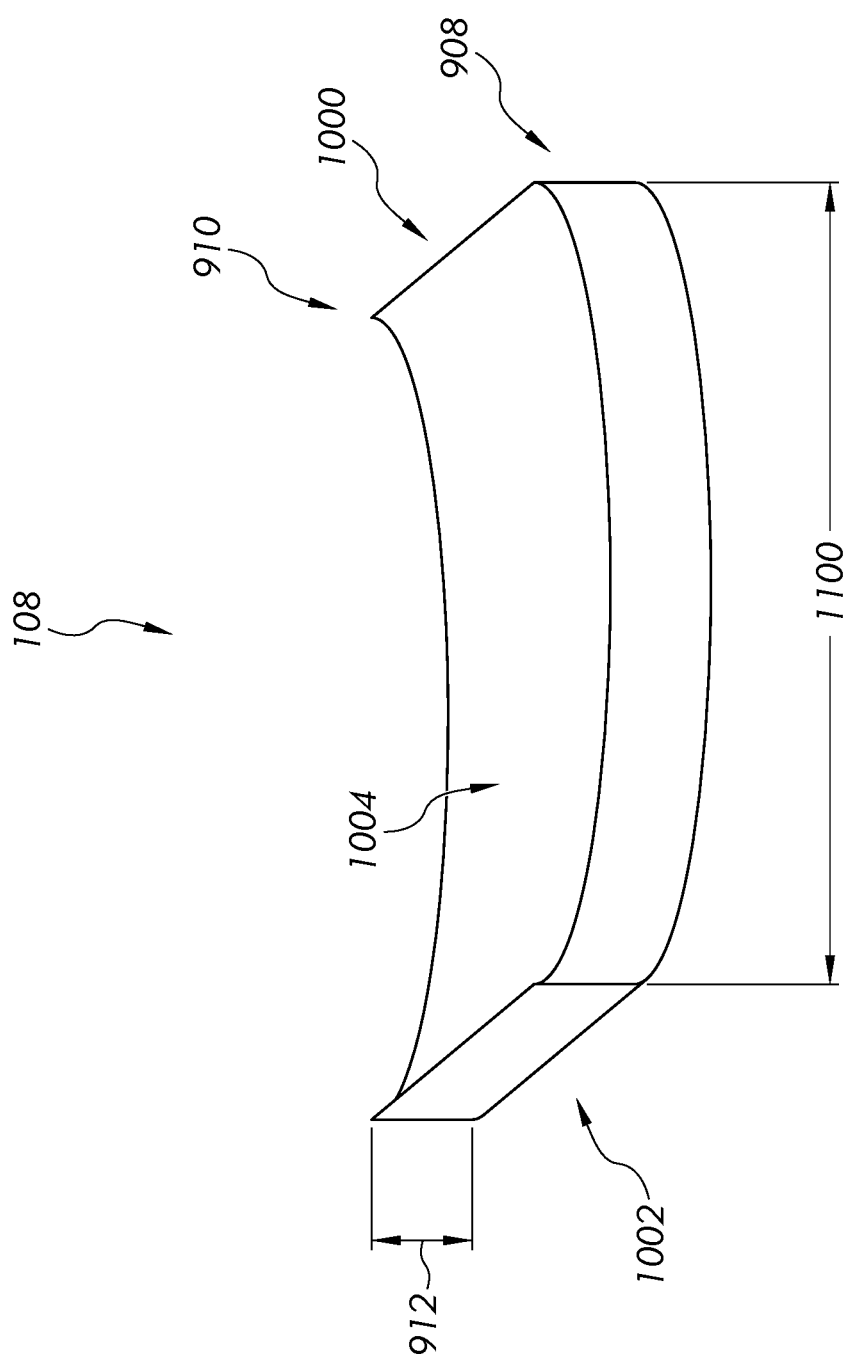
FIG. 11 is a perspective view of a tie tube in an open configuration.

Referring to FIG. 11, the tie tube 108 is shown in an unrolled state. In the unrolled state, a width 1100 of the tie tube 108 when the tie tube 108 is in an unrolled configuration is greater than at least one of the first width 1006 (shown in FIG. 10) of the first finger 610, a second width 1008 of the second finger 614, or a third width 1010 of the third finger 616. As described previously, the ratio of width 1100 to the first width 1006 of the first finger 610, the second width 1008 of the second finger 614, or the third width 1010 of the third finger 616 helps maintain the tie tube 108 in the unrolled state while the tie tube 108 is engaged with the attachment tool 600. Presentation of the tie tube 108 to the wire 102 while the tie tube 108 is in the unrolled state helps expose the interior surface 1004 which can help attach the tie tube 108 to the wire 102. The tie tube 108 can also have a thickness 912 as represented by the dimension in FIG. 11.

Figure 12:
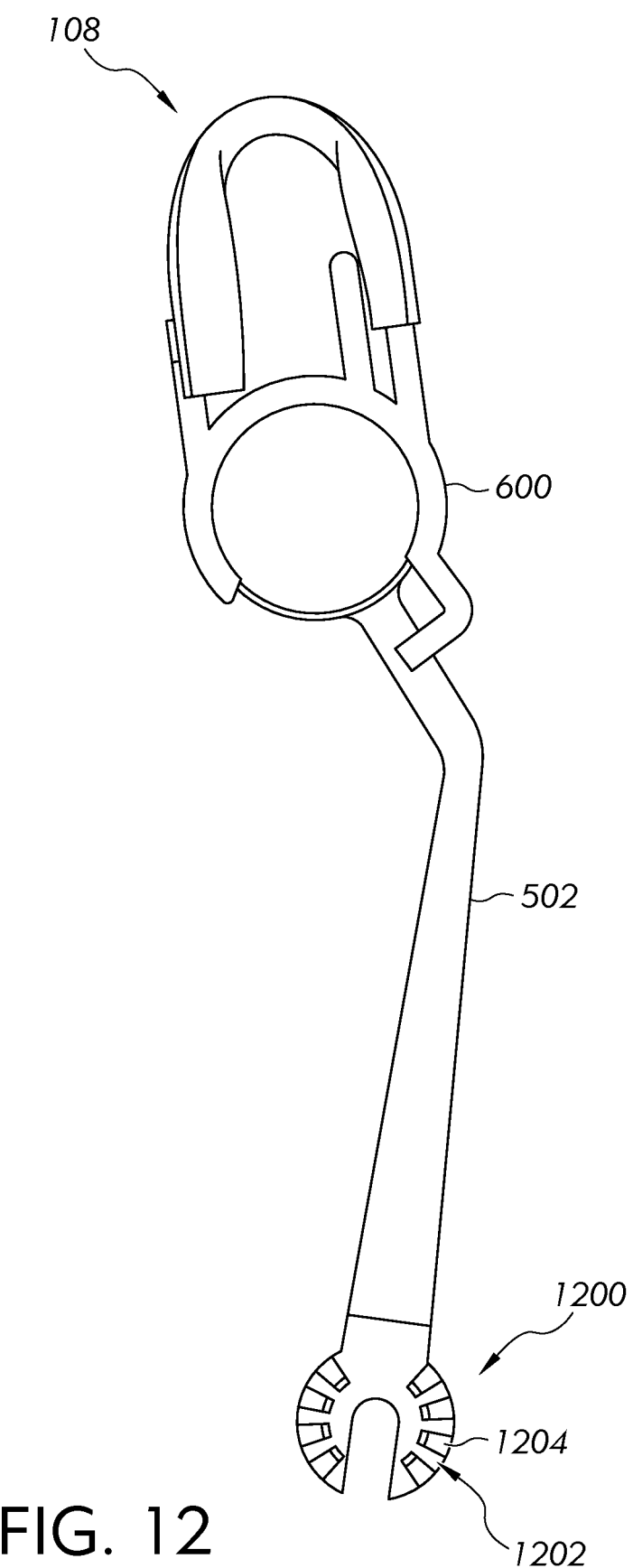
FIG. 12 is a side view of a tie tube engaged to an example attachment tool and an attachment ring tool.

Referring to FIG. 12, the tie tube 108 is shown engaged with the attachment tool 600. In turn, the attachment tool 600 is shown attached in a snap-fit arrangement to the ring tool 502. As shown, a proximal end 1200 of the ring tool 502 can include a first series of radially arranged notches 1202 and blocks 1204 that can cooperate with a second series of radially arranged notches and blocks (not shown) located on an end of a hot stick (not shown). It is to be understood that a block from one of the first or second series cooperates with a notch from the other of the first or second series to secure the ring tool 502 in a desired orientation relative to the hot stick. In some examples, a threaded fastener (not shown) is applied between the ring tool 502 and the hot stick to enable the blocks and notches from the first series to be selectively engaged to and disengaged from the notches and blocks from the second series. The selective engagement enables an electrical line worker to rotatably adjust the ring tool 502 with respect to the hot stick.

Figure 13:
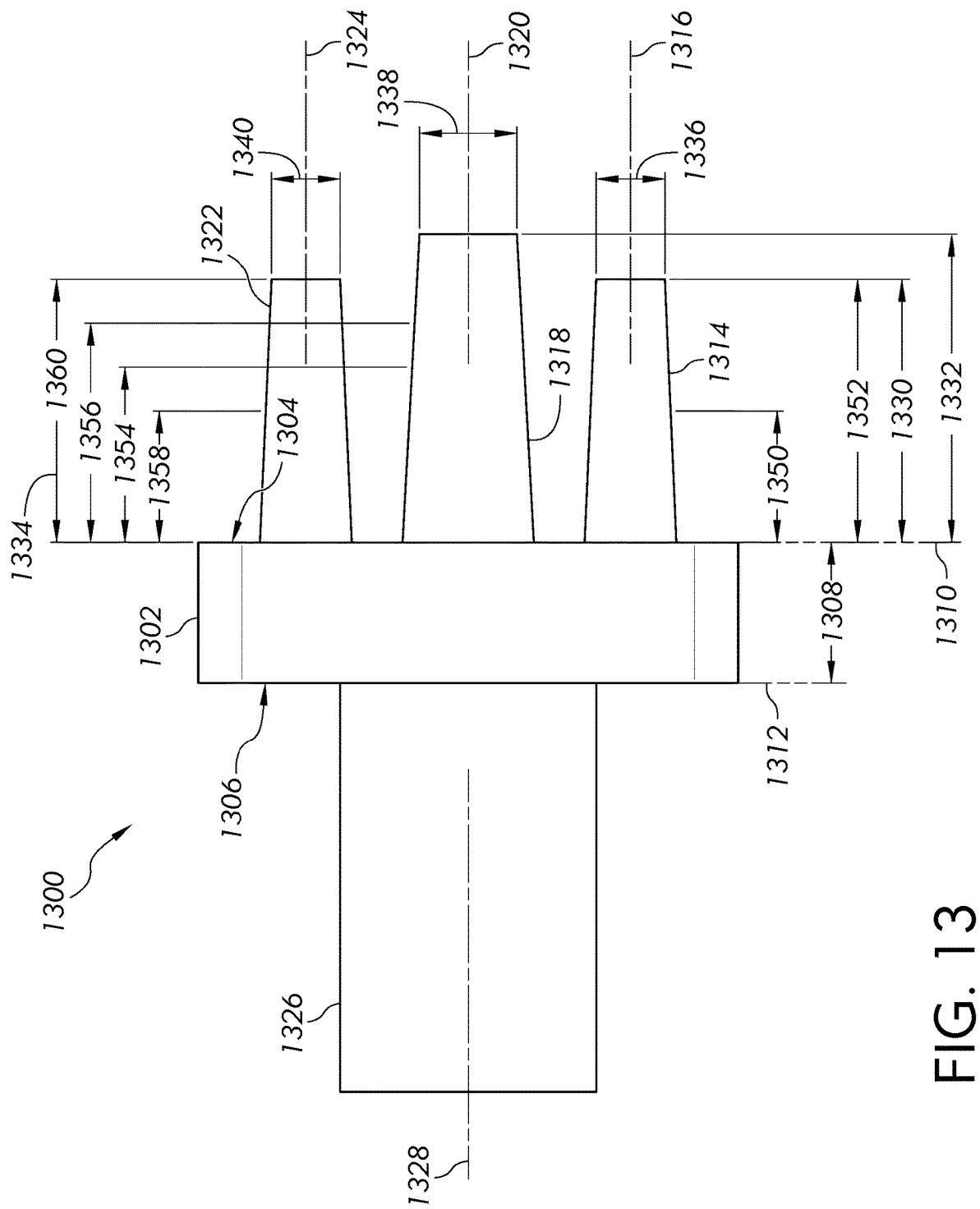
FIG. 13 is a front view of an example attachment tool.

Referring to FIG. 13, an example attachment tool 1300 is illustrated. The attachment tool 1300 includes a body 1302. The body 1302 can extend between a first side 1304 and a second side 1306. The first side 1304 can be offset from the second side 1306 by a distance 1308 such that the body 1302 has a thickness that can be represented by the distance 1308. The first side 1304 can lie within a first side plane represented by line 1310, and the second side 1306 can lie within a second side plane represented by line 1312. It is to be understood that the first side plane 1310 and the second side plane 1312 extend into and out of FIG. 13. In some examples, the first side plane 1310 is parallel with respect to the second side plane 1312.

The attachment tool 1300 includes a first finger 1314 extending away from the body 1302 along a first finger axis 1316. The attachment tool 1300 also includes a second finger 1318 extending away from the body 1302 along a second finger axis 1320, and a third finger 1322 extending away from the body 1302 along a third finger axis 1324. As shown, the second finger 1318 is between the first finger 1314 and the third finger 1322. In some examples, the first finger axis 1316, the second finger axis 1320, and the third finger axis 1324 are parallel to one another. In some examples, the first finger axis 1316, the second finger axis 1320, and the third finger axis 1324 are parallel to each another and substantially perpendicular to the first side 1304. For the purposes of this disclosure, substantially perpendicular can constitute an angle between about 85° and about 95°.

In some examples, the attachment tool 1300 includes structure 1326 configured to secure the attachment tool 1300 to a hot stick (not shown). The structure 1326 can extend away from the second side 1306 of the body 1302 along an axis 1328. In some examples, the axis 1328 can be perpendicular to the second side 1306 and parallel to the first finger axis 1316, the second finger axis 1320, and the third finger axis 1324. In other examples, the attachment tool 1300 can be integrally formed with the hot stick such that the attachment tool 1300 is a dedicated tool and hot stick combination.

Figure 14:
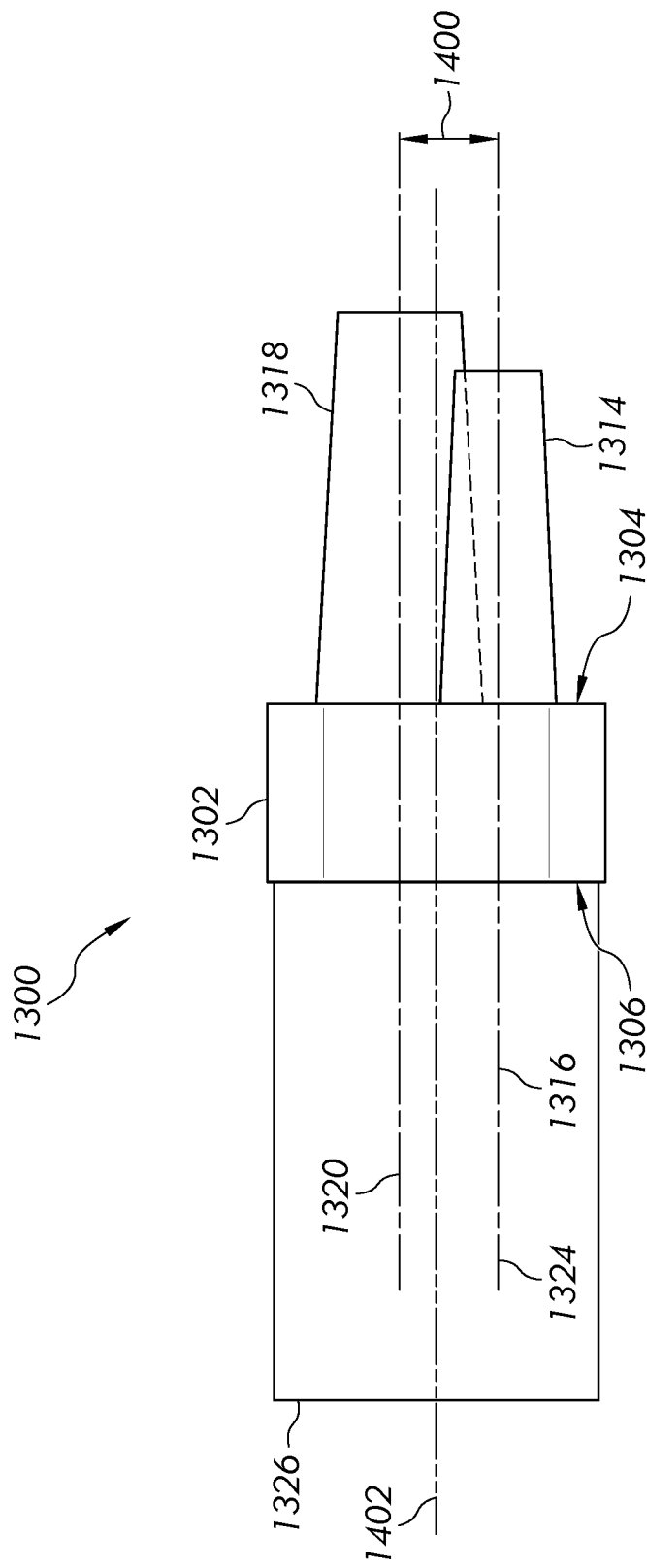
FIG. 14 is a side view of the example attachment tool of FIG. 13.

Referring to FIG. 14, a side view of the attachment tool 1300 is illustrated. In some examples, the second finger 1318 is offset from the first finger 1314 and the third finger 1322 which is directly behind the first finger 1314 and thus not visible in FIG. 14. Additionally, the dashed line represents a portion of the second finger 1318 that is hidden by the first finger 1314 in this view. The offset between the second finger 1318 from the first finger 1314 and the third finger 1322 can be represented by the distance 1400 between the first finger axis 1316 of the first finger 1314 and the second finger axis 1320 of the second finger 1318. In some examples, the second finger 1318 is offset from the first finger 1314 and the third finger 1322. In some examples, the first finger 1314 and the third finger 1322 can be intersected by a first plane (represented by the first finger axis 1316 and the third finger axis 1324). In the view of FIG. 14, the first plane 1316 is generally horizontal and passes into and out of the plane of FIG. 14 (e.g., toward and away from the viewer of FIG. 14). In some examples, the plane 1316 can bisect the first finger 1314 and bisect the third finger 1322.

The first finger 1314 and the third finger 1322 can be intersected by a second plane (represented by the line 1402). In the view of FIG. 14, the plane 1402 is generally horizontal and passes into and out of the plane of FIG. 14 (e.g., toward and away from the viewer of FIG. 14). In some examples, the offset distance 1400 is such that the first plane 1316 passes through the first finger 1314 and the third finger 1322, but the first plane 1316 does not pass through the second finger 1318. It is to be understood that plane 1316 is but one of many planes that can pass through the first finger 1314 and the third finger 1322, but not pass through the second finger 1318.

Additionally, the second plane 1402 passes through each of the first finger 1314, the second finger 1318, and the third finger 1322. Similar to the first plane 1316, the second plane 1402 is but one of many planes that can pass through each of the first finger 1314, the second finger 1318, and the third finger 1322.

Figure 15:
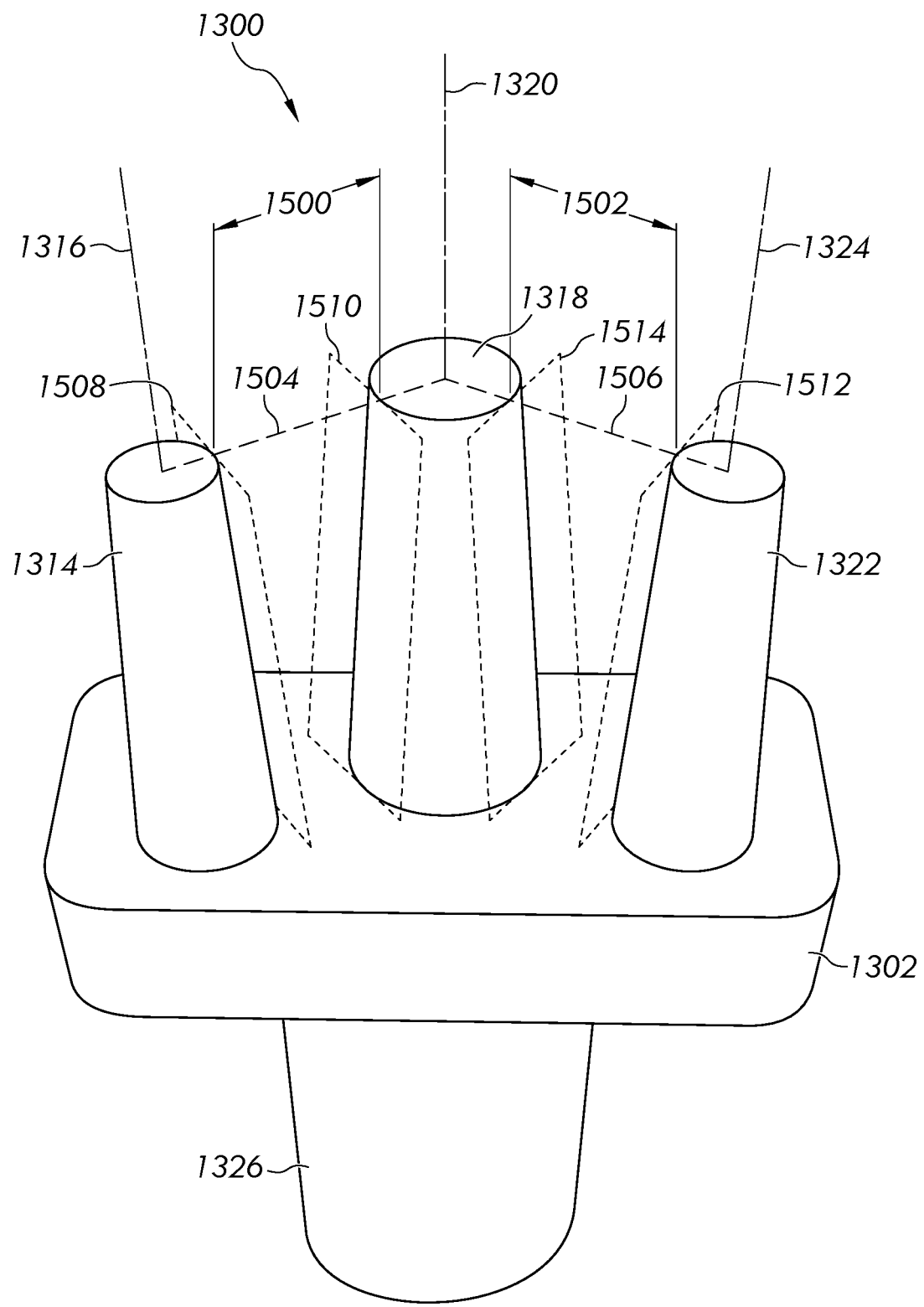
FIG. 15 is a perspective view of the example attachment tool of FIG. 13.

Referring to FIG. 15, a side perspective view of the attachment tool 1300 is illustrated. In some examples, at least one of a first distance 1500 between the first finger 1314 and the second finger 1318 or a second distance 1502 between the second finger 1318 and the third finger 1322 is equal to the thickness 912 of the tie tube 108 such that the first finger 1314, the second finger 1318, and the third finger 1322 releasably engage the tie tube 108 for attachment of the tie tube 108 to the wire 102.

In some examples, the second finger 1318 can be a different size than at least one of the first finger 1314 or the third finger 1322. For example, returning to FIG. 13, at least one of a first length 1330 of the first finger 1314 is different than a second length 1332 of the second finger 1318. In some examples, the second length 1332 of the second finger 1318 is different than a third length 1334 of the third finger 1322. As shown, the second finger 1318 can have a greater length than both the first finger 1314 and the second finger 1318 with respect to the body 1302. Returning to FIG. 15, in some examples, the first distance 1500 or the second distance 1502 can be taken at any distance from the body 1302. As such, in the case of fingers 1314, 1318, 1322 being tapered, there can be some point along the length of the fingers 1314, 1318, 1322 where at least one of the first distance 1500 between the first finger 1314 and the second finger 1318 is equal to the thickness 912 (shown in FIG. 11) of the tie tube 108 or the second distance 1502 between the second finger 1318 and the third finger 1322 is equal to the thickness 912 of the tie tube 108 as noted previously.

Returning to FIG. 13, of course, the second finger 1318 can be a different size than at least one of the first finger 1314 or the third finger 1322 in other ways as well. In some examples, the second finger 1318 is cylindrical and has a second diameter 1338 that is greater than a first diameter 1336 of the first finger 1314 or a third diameter 1340 of the third finger 1322. In other examples, the second diameter 1338 of the second finger 1318 is longer than the first diameter 1336 of the first finger 1314 and the third diameter 1340 of the third finger 1322. In other examples, at least one of the first diameter 1336 of the first finger 1314 is different than the second diameter 1338 of the second finger 1318 or the second diameter 1338 of the second finger 1318 is different than the third diameter 1340 of the third finger 1322. In some examples, the second finger 1318 can be a different size than at least one of the first finger 1314 or the third finger 1322 such that the second finger 1318 maintains the tie tube 108 in an open configuration when the tie tube 108 is engaged to the attachment tool 1300.

In other examples, at least one of the first diameter 1336 of the first finger 1314 is smaller than the second diameter 1338 of the second finger 1318 or the second diameter 1338 of the second finger 1318 is larger than the third diameter 1340 of the third finger 1322. In yet other examples, the first diameter 1336 of the first finger 1314 is equal to the third diameter 1340 of the third finger 1322. In such examples, the two outer fingers (e.g., first finger 1314 and third finger 1322) are smaller than the middle finger (e.g., the second finger 1318).

Remaining with FIG. 13, at least one of the first finger 1314, the second finger 1318, or the third finger 1322 is tapered. In some examples, each of the first finger 1314, the second finger 1318, or the third finger 1322 are tapered and can include conical shapes or frusto-conical shapes. In some examples, a first cross-sectional area of the first finger 1314 at a first first finger body distance 1350 from the body 1302 is greater than a second cross-sectional area of the first finger 1314 at a second first finger body distance 1352 from the body 1302. In some examples, the second first finger body distance 1352 is greater than the first first finger body distance 1350. In other words, the first finger 1314 tapers to have a lesser cross-sectional area as the distance along the first finger 1314 increases from the body 1302.

Similarly, a first cross-sectional area of the second finger 1318 at a first second finger body distance 1354 from the body 1302 is greater than a second cross-sectional area of the second finger 1318 at a second second finger body distance 1356 from the body 1302. In some examples, the second second finger body distance 1356 is greater than the first second finger body distance 1354. In other words, the second finger 1318 tapers to have a lesser cross-sectional area as the distance along the first finger 1318 increases from the body 1302.

As with the other two fingers, a first cross-sectional area of the third finger 1322 at a first third finger body distance 1358 from the body 1302 is greater than a second cross-sectional area of the third finger 1322 at a second third finger body distance 1360 from the body 1302. In some examples, the second third finger body distance 1360 is greater than the first third finger body distance 1358. In other words, the third finger 1322 tapers to have a lesser cross-sectional area as the distance along the third finger 1322 increases from the body 1302.

Returning to FIG. 15, a first line 1504 can be drawn from the first finger axis 1316 to the second finger axis 1320 at any distance from the body 1302. A similar second line 1506 can be drawn from the third finger axis 1324 to the second finger axis 1320 at any distance from the body 1302. A first finger side plane 1508 can be described as being tangent to a side of the first finger 1314 where the first line 1504 intersects the outside diameter of the first finger 1314. A second finger side plane 1510 can be described as being tangent to a side of the second finger 1318 where the first line 1504 intersects the outside diameter of the second finger 1318. The first finger side plane 1508 is not parallel to the second finger side plane 1510. Furthermore, the first finger side plane 1508 and the second finger side plane 1510 are not parallel to either the first finger axis 1316 or the second finger axis 1320. In some examples, a side of the second finger 1318 facing the first finger 1314 lies in the second finger side plane 1510. The second finger side plane 1510 is not parallel to the first finger side plane 1508.

A third finger side plane 1512 can be described as being tangent to a side of the third finger 1322 where the second line 1506 intersects the outside diameter of the third finger 1322. A fourth finger side plane 1514 can be described as being tangent to a side of the second finger 1318 where the second line 1506 intersects the outside diameter of the second finger 1318. In some examples, the third finger side plane 1512 is not parallel to any of the fourth finger side plane 1514, the second finger side plane 1510, or the first finger side plane 1508 such that the third distance 626 between the first end 628 of the second finger 614 distal from the hot stick 500 and the first end 630 of the third finger 616 distal from the hot stick 500 is greater than the fourth distance 632 between the second end 634 of the second finger 614 proximal to the hot stick 500 and the second end 636 of the third finger 616 proximal to the hot stick 500 as previously discussed and shown in FIG. 6. Returning to FIG. 15, furthermore, none of the first finger side plane 1508, the second finger side plane 1510, the third finger side plane 1512, or the fourth finger side plane 1514 are parallel to any of the first finger axis 1316, the second finger axis 1320, or the third finger axis 1324.

Of course, this attachment method of the tie tube 108 to the attachment tool 1300 is but one of many possible attachment configurations based upon the relationships of the dimensions of the first distance 1500, the second distance 1502, and the thickness 912 of the tie tube 108. In some examples, the varying distance between the first finger 1314 and the second finger 1318 and the varying distance between the third finger 1322 and the second finger 1318 can provide a distance that is equal to the thickness 912 of the tie tube 108 at some distance away from the body 1302. Should the user choose to do so, the tie tube 108 can be placed into the separation between the fingers 1314, 1318, and 1322 at any distance away from the body 1302 to provide a desired force to maintain engagement between the tie tube 108 and the fingers 1314, 1318, and 1322. In some examples, the tapered configuration of the fingers 1314, 1318, and 1322 eases the eventual separation (e.g., disengagement) of the tie tube 108 from the attachment tool 1300 in order to attach the tie tube 108 to the wire 102. Any suitable shape or profile for the fingers 1314, 1318, and 1322 can be used with the present disclosure.

Figure 16:
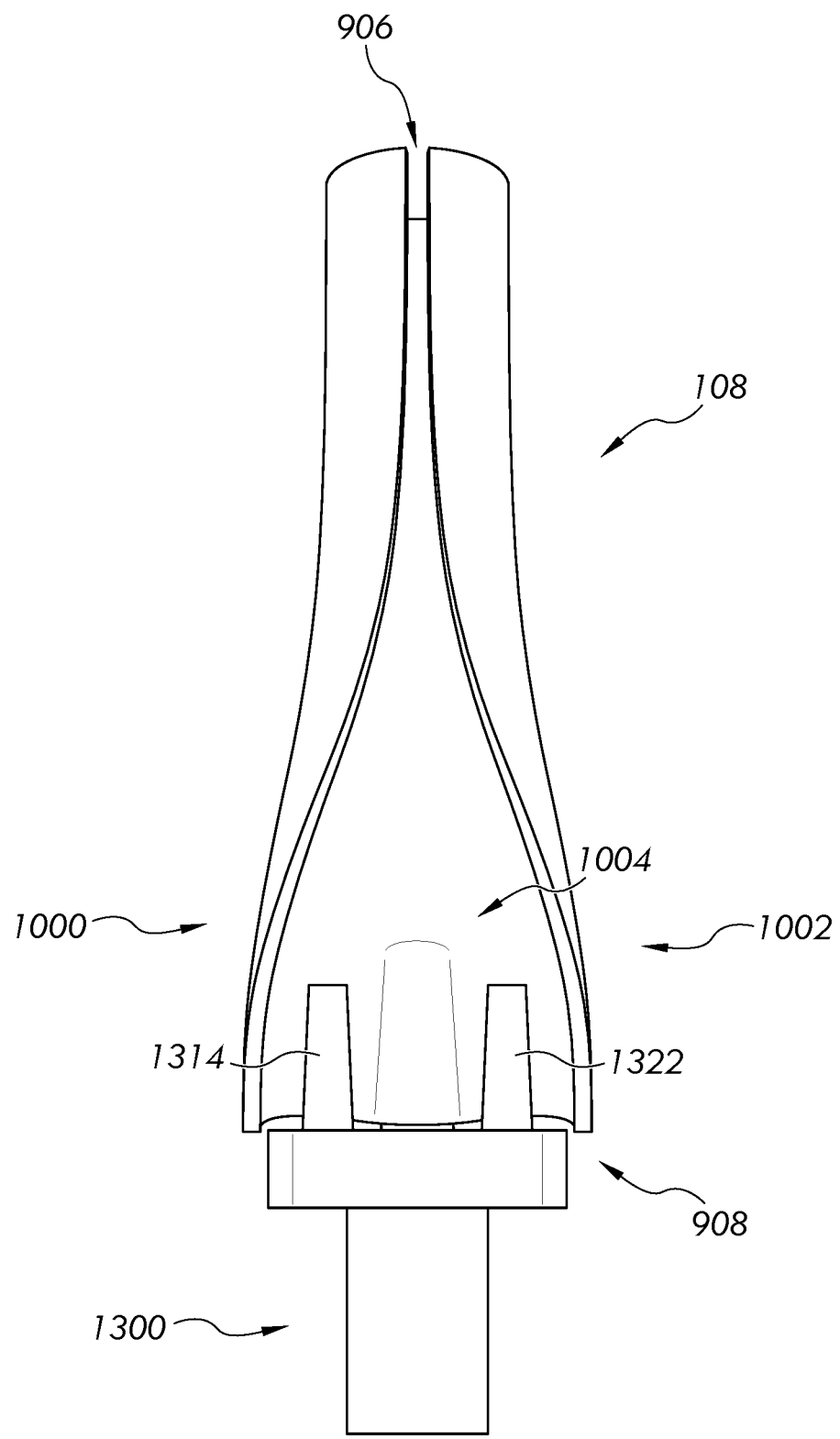
FIG. 16 is a perspective view of a tie tube engaged to the example attachment tool of FIG. 13.

Referring to FIG. 16, the attachment tool 1300 is illustrated with the tie tube 108 engaged with the attachment tool 1300. The attachment tool 1300 and its structures are configured to engage the tie tube 108, hold the tie tube 108 in an open configuration, and urge the tie tube 108 onto the wire 102 to attach the tie tube 108 to the wire 102. In FIG. 16, the tie tube 108 is shown in the open configuration and held in that position by the attachment tool 1300. The electrical line worker can open or unroll the tie tube 108 by separating a first side 1000 of the tie tube 108 from a second side 1002 of the tie tube 108. The first side 1000 and the second side 1002 define the gap 906, and separation of the two sides 1000, 1002 exposes the interior surface 1004 of the tie tube 108. The electrical line worker can then place the interior surface 1004 of the first end 908 of the tie tube 108 adjacent (e.g., contacting) the first finger 1314 and the third finger 1322. An exterior surface of the tie tube 108 opposite the interior surface 1004 can contact the second finger 1318. In some examples, the second finger 1318 can place the tie tube 108 into a position such that the tie tube 108 is in a three-curve orientation. A first curve of the three-curve orientation is caused by the first finger 1314, a second curve of the three-curve orientation is caused by the second finger 1318, and a third curve of the three-curve orientation is caused by the third finger 1322. In some examples, this orientation of the tie tube 108 can be described as the tie tube 108 having a serpentine path around the three fingers 1314, 1318, and 1322, the tie tube 108 three inflection points. As has been previously discussed, the geometry and dimensions of the fingers 1314, 1318, and 1322 help to engage the tie tube 108 and maintain the tie tube in the engaged position shown in FIG. 16 until the tie tube 108 is attached to the wire 102. In some examples, the second finger 1318 maintains the tie tube 108 in an open configuration such as having the interior surface 1004 facing outward to contact the wire 102 when the tie tube 108 is engaged to the attachment tool 1300.

Also as previously discussed, the tapered configuration of the fingers 1314, 1318, and 1322 can help ease the release of the tie tube 108 from the attachment tool 1300 when the tie tube 108 is attached to the wire 102. It is also worthy of note that the attachment tool 1300 and the fingers 1314, 1318, and 1322 can engage the tie tube 108 and maintain the first end 908 of the tie tube 108 in the open configuration or at least in a semi-open configuration. The open configuration or the semi-open configuration enables the electrical line worker to attach the tie tube 108 to the wire 102. As with some previous examples, and to briefly outline a method of operation, the electrical line worker can open or unroll the first end 908 of the tie tube by separating the first side 1000 of the tie tube 108 from the second side 1002 of the tie tube 108. The electrical line worker can then urge the first end 908 of the tie tube 108 into the gaps between the fingers 1314, 1318, and 1322 to engage the tie tube 108 to the attachment tool 1300. As with some previous examples, the engagement of the tie tube 108 to the attachment tool 1300 exposes a portion of the interior surface 1004 in preparation for presentation of the interior surface 1004 to the wire 102. The electrical line worker can then use the attachment tool 1300 to attach the tie tube 108 to the wire 102 as will be described below.

Figure 17:
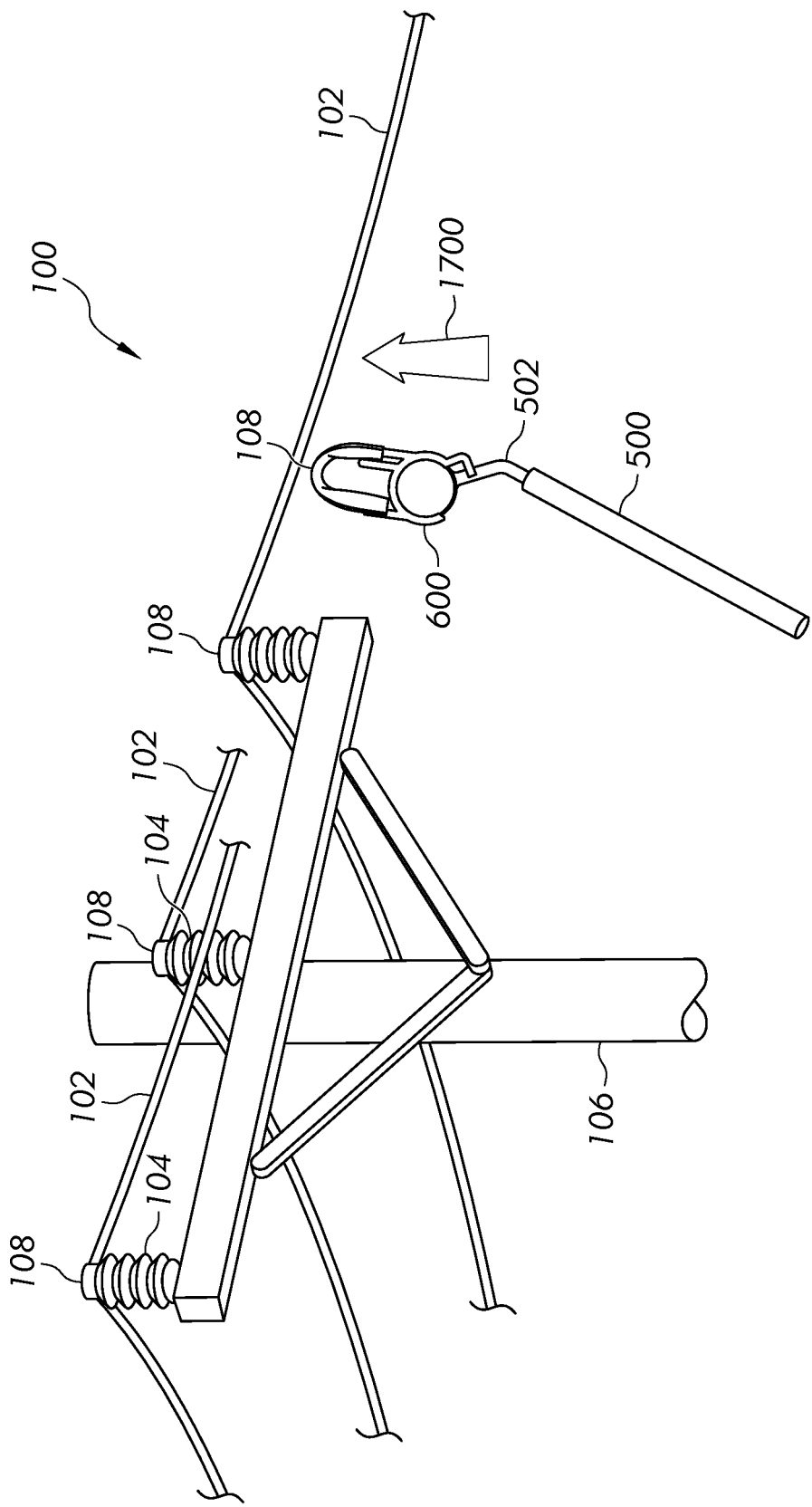
FIG. 17 is a perspective view of a tie tube engaged to the example attachment tool approaching a wire.
Figure 18:
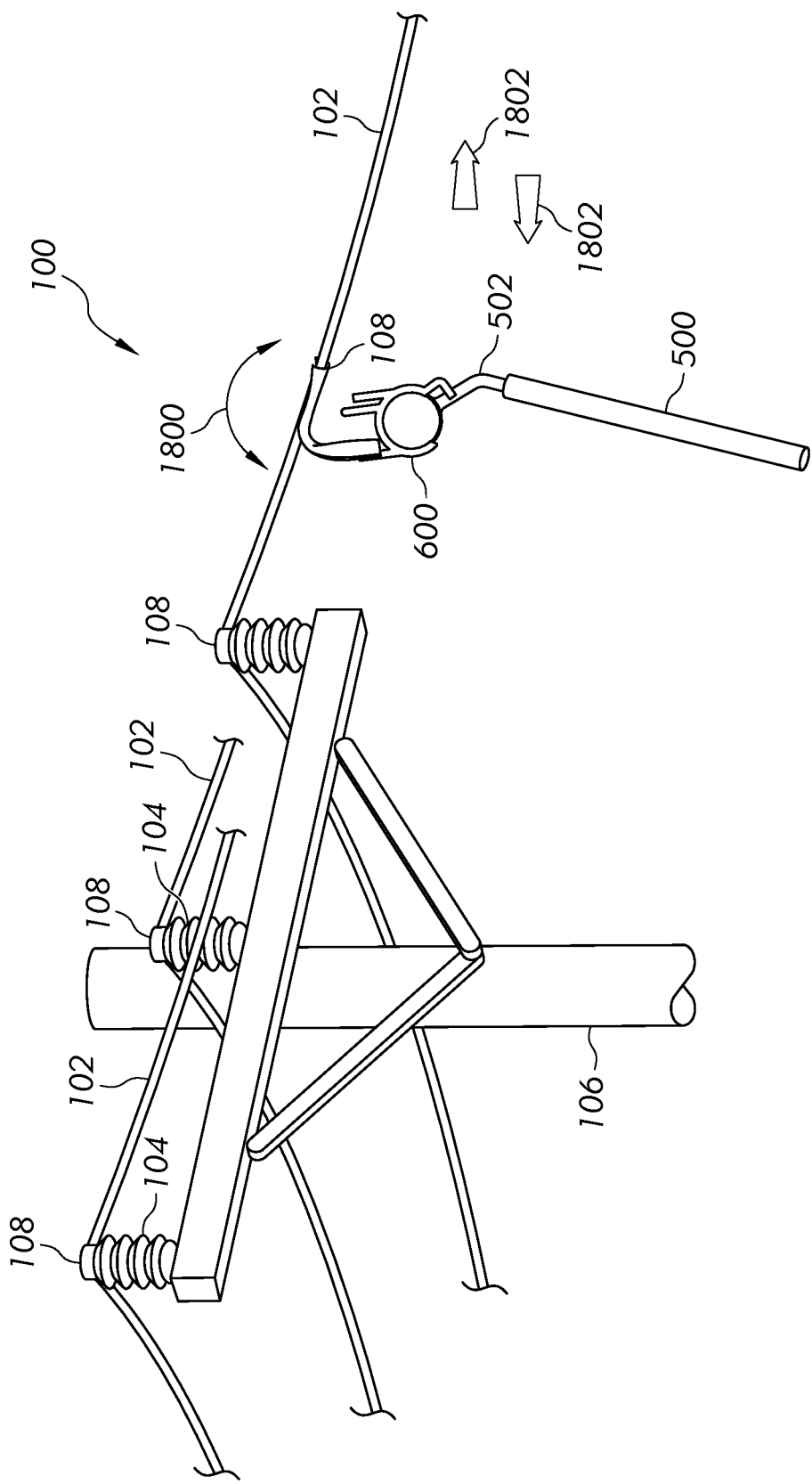
FIG. 18 is a perspective view of the tie tube with a first end engaged with the example attachment tool and a second end engaged with the wire.
Figure 19:
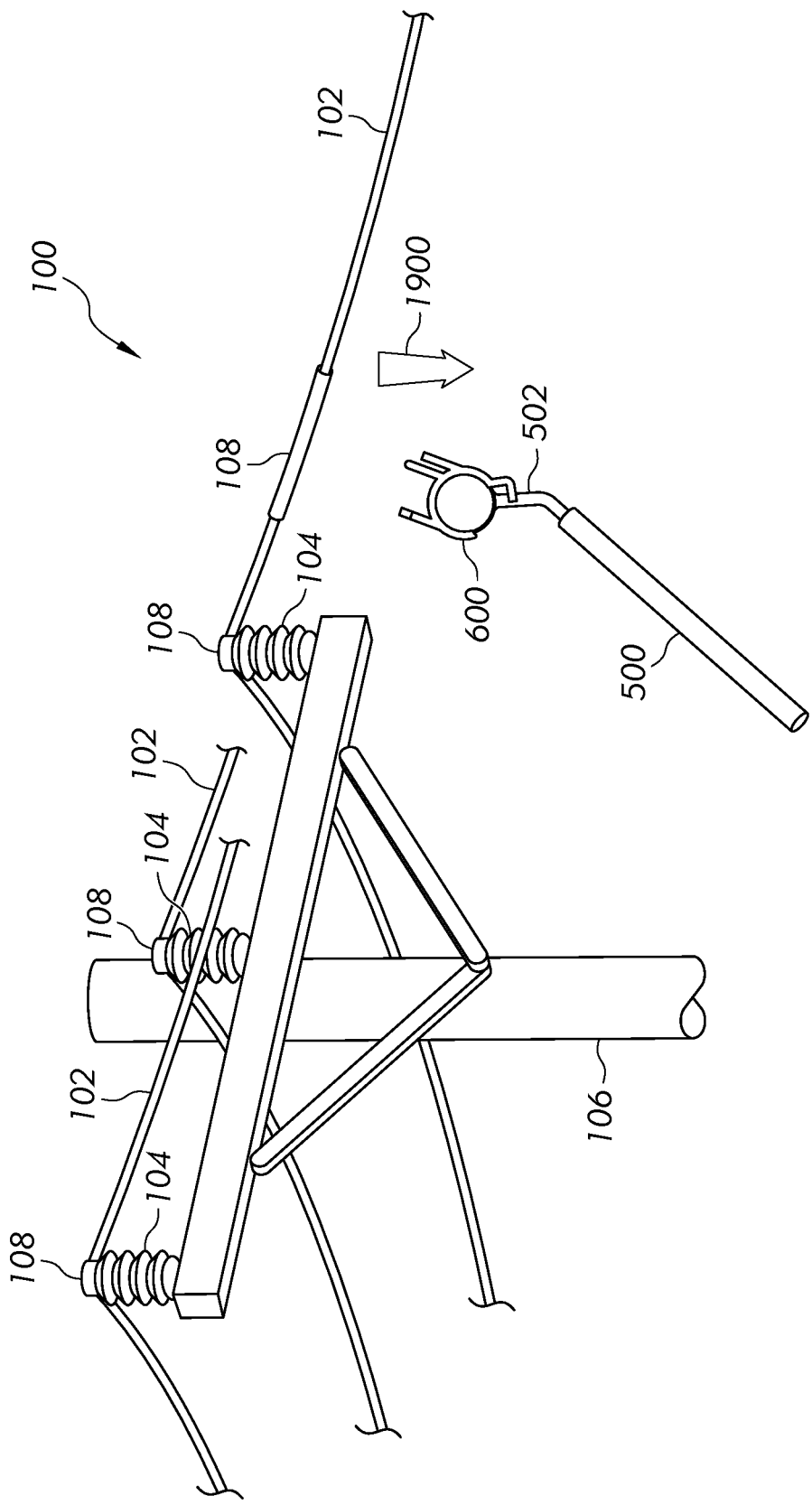
FIG. 19 is a perspective view of the tie tube engaged with the wire after attachment.

Referring to FIGS. 17-19, a graphical representation of a method of attaching the tie tube 108 to the wire 102 is illustrated. FIGS. 17-19 and the following description refer specifically to the attachment tool 600 and the tie tube 108, however, it is to be appreciated that the tie tube 108 can be attached to the wire 102 with the attachment tool 1300 in much the same way, as can other, minor variations of attachment tools. As such, the following description and FIGS. 17-19 are applicable to the attachment tool 1300 as well as the attachment tool 600.

Referring to FIG. 17, and as previously discussed, the electrical line worker engages the tie tube 108 with the attachment tool 600 such that the interior surface 1004 of the tie tube 108 is presented for attachment to the wire 102. Then, using the hot stick 500, from which the ring tool 502 and the attachment tool 600 extend, the electrical line worker urges the interior surface 1004 of the tie tube 108 into contact with the wire 102. In some examples, the hot stick 500 is urged toward the wire 102 in a direction represented by arrow 1700 (e.g., upward from the perspective of the electrical line worker).

Referring to FIG. 18, Urging the interior surface 1004 of the tie tube 108 into contact with the wire 102 can cause the first side 1000 of the tie tube 108 toward the second side 1002 of the tie tube 108, thus moving the tie tube 108 toward a closed configuration. The tie tube 108 is biased toward the closed configuration and remains in the open configuration only when acted upon by forces applied to the tie tube 108 such as by the fingers 610, 614, 616. The electrical line worker can then move the hot stick 500 (along with the ring tool 502, the attachment tool 600, and the tie tube 108) such that an increasing area of the interior surface 1004 of the tie tube 108 comes into contact with the wire 102.

In some examples, the movement of the attachment tool 600 includes moving the hot stick 500 and attachment tool 600 in a rotational movement represented by arrow 1800 while pressing the tie tube 108 onto the wire 102 and rolling the attachment tool 600 about an axis substantially perpendicular to an axis of the wire 102. In other words, disengagement of the tie tube 108 from the attachment tool 600 and attachment to the wire 102 is generated by simply rotating the attachment tool 600 out of plane. Rotation of the attachment tool 600 places an increasing area of the interior surface 1004 into contact with the exterior surface of the wire 102 as the attachment tool 600 rotates.

In some examples, this includes moving the hot stick 500 in a direction 1802 parallel to or substantially parallel to an axis of the wire 102. In FIG. 18, this direction 1802 is generally left to right or right to left. The combination of an upward force and movement in the direction 1802 enables the tie tube 108 to attach to the wire 102 and disengage from the attachment tool 600. As the tie tube 108 disengages from the attachment tool 600, the tie tube 108 reverts back to its closed configuration, and the first side 1000 of the tie tube 108 moves toward the second side 1002 of the tie tube 108 thereby attaching the tie tube 108 to the wire 102 by surrounding an exterior surface of the wire 102. Movement of the attachment tool 600 (e.g., in direction 1802) applies a force to the tie tube 108 that overcomes an engagement force between the tie tube 108 and the attachment tool 600.

Referring to FIG. 19, the electrical line worker can then remove the hot stick 500 and attachment tool 600 from close proximity to the wire 102 (represented by arrow 1900) and apply a tie tube 108 at another location along the wire 102 or a second wire. In some examples, the electrical line worker will move the tie tube 108 to a position between the wire 102 and an attachment structure 104 (e.g., the insulator).

Returning to FIG. 4, the electrical line worker can then complete the installation process of the tie tube 108, if additional operations are required. For example, the electrical line worker can use the attachment tool 600 to move the tie tube 108 along the wire 102 in the direction(s) indicated by arrow 408 to place the tie tube 108 within a concave portion of the attachment structure 104 (e.g., an insulator). Use of the attachment tool 600 can be advantageous to move the tie tube 108 in the direction 408, as many existing tools (e.g., the ring tool 502) do not include flat surfaces that can be conducive to applying a force to the tie tube 108. For example, the ring tool 502 can include rounded surfaces as shown in several of the figures. In some examples, the tie tube 108 can be moved (e.g., slid along the wire 102 in direction 408) when the tie tube 108 is still partially engaged with the attachment tool 600 to enable ease of control of the tie tube 108.

The electrical line worker can then use the attachment tool 600 or the ring tool 502 in order to wrap the helical wrap around the wire 102, the attachment structure 104, and the tie tube 108 to complete the installation. Other assemblies having more or fewer components are also contemplated.

The apparatus and methods of the present disclosure can provide several benefits. In some examples, electrical line workers attach the tie tube to the wire using a hot stick without a dedicated attachment tool. The attachment task is relatively difficult, particularly when considering the wire can be energized during the attachment task. Some electric utilities allow tie tube attachment to energized (e.g., "live") wires if the electrical line worker adheres to particular precautions. At times, these precautions can render the tie tube more difficult to apply to the wire. This is because thick rubber gloves and non-conductive extensions to the hot stick are often required for this type of tie tube attachment as precautions against the electrical line worker becoming part of a ground circuit. Attachment of the tie tube is a task that requires significant skill and finesse, and the gloves and extensions inhibit the electrical line worker from using fine motor skills and soft touch skills required to accurately attach the tie tube to the wire.

As discussed, the applicator ring tool is not configured to manipulate, engage, move, etc. the tie tube, and use of the ring tool to attach the tie tube is at once clumsy and time consuming, thereby wasting time and money of the electric utility or electrical contractors. Use of the described methods and apparatus can reduce the amount of time required to attach the tie tubes to the wire. Additionally, some tie tube attachment tasks require two electrical line workers. Use of the described methods and apparatus can reduce the number of electrical line workers (e.g., to one) required to attach the tie tubes to the wire.

Because there is a need to apply the tie tube at a distance from the attachment structure (e.g., the insulator) and then slide the tie tube into a desired position, the ring tool was particularly ill-suited to this task. The described attachment tool can ease the grasp and slide task for the electrical line worker.

Another benefit of the described apparatus is that the attachment tool is configured to fit over existing, ubiquitous ring tools. As such, electric utilities and contractors are not required to obtain multiple pieces of equipment at high cost or provide relatively large time periods of training for proper application of the tie tubes.

The innovation can enable significantly greater ease of installation of tie tubes with the use of a hot stick that is not reliant on a high level of skill. The tie tube is pressed into a vertical slot (e.g., the spacing between fingers) and bent over an upright to position the tie tube in an open configuration. This bending of the tie tube allows the tie tube to act as a spring which maintains the tie tube in the vertical slot. By bending the tie tube, the tie tube is opened up for installation onto the wire. The end of the tie tube that is opposite of the finger, is held in place by friction against another finger. As noted, installation of the application tool is easily snapped into place over many available applicator ring tools. Once snapped over the applicator ring tool, the attachment tool is rotated around the ring tool circumference and snapped into the applicator ring stem to prevent rotation during attachment of the tie tube to the wire.

Use of the presently described apparatus can also increase the use of tie tubes to create attachment assemblies that are compliant with testing and installation industry standards. Because the presently known apparatus and methods require finesse, skill, luck, or some combination thereof, many electrical line workers simply discard the tie tube rather than expending the time and energy to properly attaching the tie tube to the wire. This can lead to premature wear between the wire and the insulator, making electrical distribution networks less reliable and requiring more frequent maintenance.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component generally correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An attachment tool for attaching a tie tube to a wire, comprising:
    a body;
    a first engagement portion extending away from the body, the first engagement portion releasably engaging a first end of the tie tube for attachment of the first end of the tie tube to the wire;
    a second engagement portion extending away from the body, the second engagement portion releasably engaging a second end of the tie tube for attachment of the second end of the tie tube to the wire after attachment of the first end of the tie tube to the wire; and
    a coupling structure connected to the body, the coupling structure coupling to a hot stick, wherein:
        the first engagement portion comprises a first finger extending away from the body, and
        the second engagement portion comprises a second finger extending away from the body and a third finger extending away from the body, wherein the second finger is between the first finger and the third finger.

2. The attachment tool of claim 1, wherein a first distance between the first finger and the second finger is greater than a second distance between the second finger and the third finger.

3. The attachment tool of claim 2, wherein the second distance is equal to a thickness of the tie tube.

4. The attachment tool of claim 2, wherein:
a third distance between a first end of the second finger distal from the hot stick and a first end of the third finger distal from the hot stick is greater than a fourth distance between a second end of the second finger proximal to the hot stick and a second end of the third finger proximal to the hot stick.

5. The attachment tool of claim 1, wherein a first end of the second finger distal from the hot stick extends above a line drawn between a first end of the first finger distal from the hot stick and a first end of the third finger distal from the hot stick.

6. The attachment tool of claim 1, wherein a width of the tie tube when the tie tube is in an unrolled configuration is greater than at least one of a first width of the first finger, a second width of the second finger, or a third width of the third finger.

7. The attachment tool of claim 1, wherein the second finger emanates from the third finger such that the second finger is separated from the body by a separation distance.

8. The attachment tool of claim 1, wherein the coupling structure comprises an annular portion that couples to an annular portion of an applicator ring tool extending from the hot stick.

9. The attachment tool of claim 1, wherein the coupling structure comprises an arm portion that couples to a linear portion of an applicator ring tool extending from the hot stick.

10. An attachment tool for attaching a tie tube to a wire, comprising:
a body;
a first finger extending away from the body;
a second finger extending away from the body; and
a third finger extending away from the body, wherein
the second finger is between the first finger and the third finger,
the second finger is offset from the first finger and the third finger such that a first plane passing through the first finger and the third finger does not pass through the second finger and a second plane passing through the first finger and the third finger does pass through the second finger, and
at least one of a first distance between the first finger and the second finger is equal to a thickness of the tie tube or a second distance between the second finger and the third finger is equal to a thickness of the tie tube such that the first finger, the second finger, and the third finger releasably engage the tie tube for attachment of the tie tube to the wire.

11. The attachment tool of claim 10, wherein the second finger is a different size than at least one of the first finger or the third finger.

12. The attachment tool of claim 11, wherein at least one of a first length of the first finger is different than a second length of the second finger or the second length of the second finger is different than a third length of the third finger.

13. The attachment tool of claim 11, wherein at least one of a first diameter of the first finger is different than a second diameter of the second finger or the second diameter of the second finger is different than a third diameter of the third finger.

14. The attachment tool of claim 11, wherein at least one of a first diameter of the first finger is smaller than a second diameter of the second finger or the second diameter of the second finger is larger than a third diameter of the third finger.

15. The attachment tool of claim 14, wherein the first diameter of the first finger is equal to the third diameter of the third finger.

16. The attachment tool of claim 11, wherein at least one of the first finger, the second finger, or the third finger is tapered, such that at least one of:
a first cross-sectional area of the first finger at a first first finger body distance from the body is greater than a second cross-sectional area of the first finger at a second first finger body distance from the body, the second first finger body distance greater than the first first finger body distance,
a first cross-sectional area of the second finger at a first second finger body distance from the body is greater than a second cross-sectional area of the second finger at a second second finger body distance from the body, the second second finger body distance greater than the first second finger body distance, or
a first cross-sectional area of the third finger at a first third finger body distance from the body is greater than a second cross-sectional area of the third finger at a second third finger body distance from the body, the second third finger body distance greater than the first third finger body distance.

17. An attachment tool for attaching a tie tube to a wire, comprising:
a body;
a first engagement portion extending away from the body, the first engagement portion releasably engaging a first end of the tie tube for attachment of the first end of the tie tube to the wire;
a second engagement portion extending away from the body, the second engagement portion releasably engaging a second end of the tie tube for attachment of the second end of the tie tube to the wire after attachment of the first end of the tie tube to the wire; and
a coupling structure connected to the body, the coupling structure coupling to a hot stick, wherein:
the coupling structure comprises an annular portion that couples to an annular portion of an applicator ring tool extending from the hot stick.

18. The attachment tool of claim 17, wherein the first engagement portion comprises a first finger extending away from the body.

19. An attachment tool for attaching a tie tube to a wire, comprising:
a body;
a first engagement portion extending away from the body, the first engagement portion releasably engaging a first end of the tie tube for attachment of the first end of the tie tube to the wire;
a second engagement portion extending away from the body, the second engagement portion releasably engaging a second end of the tie tube for attachment of the second end of the tie tube to the wire after attachment of the first end of the tie tube to the wire; and a coupling structure connected to the body, the coupling structure coupling to a hot stick, wherein:
the coupling structure comprises an arm portion that couples to a linear portion of an applicator ring tool extending from the hot stick.

20. The attachment tool of claim 19, wherein the first engagement portion comprises a first finger extending away from the body.

\* \* \* \* \*